(12) United States Patent
Taherzadeh Boroujeni et al.

(10) Patent No.: US 12,167,463 B2
(45) Date of Patent: Dec. 10, 2024

(54) TECHNIQUES FOR CHANNEL REPETITION COUNTING

(71) Applicant: QUALCOMM Incorporated, San Diego, CA (US)

(72) Inventors: Mahmoud Taherzadeh Boroujeni, San Diego, CA (US); Tao Luo, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 17/648,536

(22) Filed: Jan. 20, 2022

(65) Prior Publication Data
US 2022/0240323 A1     Jul. 28, 2022

Related U.S. Application Data

(60) Provisional application No. 63/140,823, filed on Jan. 23, 2021.

(51) Int. Cl.
*H04W 74/0833*     (2024.01)
*H04W 74/00*       (2009.01)

(52) U.S. Cl.
CPC .............................. *H04W 74/0833* (2013.01)

(58) Field of Classification Search
CPC ................................................. H04W 74/0833
See application file for complete search history.

(56) References Cited

U.S. PATENT DOCUMENTS

| | | | | |
|---|---|---|---|---|
| 2019/0116622 | A1* | 4/2019 | Suzuki | H04W 84/00 |
| 2019/0261252 | A1* | 8/2019 | John Wilson | H04W 72/0446 |
| 2019/0342921 | A1* | 11/2019 | Loehr | H04L 5/0044 |
| 2020/0314815 | A1* | 10/2020 | Kim | H04L 1/1671 |

(Continued)

FOREIGN PATENT DOCUMENTS

WO    WO-2019216818 A1    11/2019

OTHER PUBLICATIONS

China Telecom: "Enhancements on PUSCH Repetition Type A", 3GPP TSG RAN WG1 #104, 3GPP Draft, R1-2100915, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021 (Jan. 18, 2021), 3 Pages, XP051970579, Retrieved from the Internet: URL: https://ftp.3gpp.org/tsg_ran/WG1_RL1/TSGR1_104-e/Docs/R1-2100915.zip, R1-2100915.doc, [retrieved on Jan. 18, 2021], Section 1, p. 1 "Proposal 2" and paragraph above it, p. 2.

(Continued)

*Primary Examiner* — Jenee Holland
(74) *Attorney, Agent, or Firm* — Patterson & Sheridan LLP

(57) ABSTRACT

Certain aspects of the present disclosure provide techniques for channel repetition. One example method by a user equipment (UE) may include receiving a first indication of one or more first slots that are counted for one or more repetitions of a random access channel (RACH) message and a second indication of a number of the one or more repetitions, each of the repetitions of the RACH message being during a slot available for uplink communication; and transmitting, to a base station, the RACH message and the one or more repetitions in accordance with the first indication and the second indication.

26 Claims, 14 Drawing Sheets

(56) References Cited

U.S. PATENT DOCUMENTS

| | | | |
|---|---|---|---|
| 2021/0051707 A1* | 2/2021 | Rastegardoost | H04L 5/0051 |
| 2021/0136830 A1* | 5/2021 | Lin | H04W 72/23 |
| 2021/0203397 A1* | 7/2021 | Xiong | H04W 72/046 |
| 2021/0235503 A1* | 7/2021 | Irukulapati | H04L 1/08 |
| 2021/0251016 A1* | 8/2021 | Xiong | H04L 1/0061 |
| 2021/0266973 A1* | 8/2021 | Taherzadeh Boroujeni | H04B 7/088 |
| 2021/0360660 A1* | 11/2021 | Cozzo | H04L 1/1896 |
| 2022/0006575 A1* | 1/2022 | Cozzo | H04L 1/1819 |
| 2022/0015089 A1* | 1/2022 | Shin | H04W 72/21 |
| 2022/0015139 A1* | 1/2022 | Kim | H04L 5/00 |

OTHER PUBLICATIONS

China Telecom: "Potential Solutions for PUSCH Coverage Enhancements", 3GPP TSG RAN WG1 #102-e 3GPP Draft, R1-2005732, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020 (Aug. 7, 2020), 11 Pages, XP051914999, Retrieved from the Internet: URL: https://ftp.3gpp.org/tsg_ran/WG1_RL1/TSGR1_102-e/Docs/R1-2005732.zip, R1-2005732.doc, [retrieved on Aug. 7, 2020] Proposals 2 and 3, and paragraphs above them, p. 2.

International Search Report and Written Opinion—PCT/US2022/013361—ISA/EPO—May 3, 2022.

Samsung: "Type A PUSCH Repetitions forMsg3", 3GPP TSG RAN WG1 #104-e, 3GPP Draft, R1-2101225, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), 4 Pages, XP051971438, Retrieved from the Internet: URL: https://ftp.3gpp.org/tsg_ran/WG1_RL1/TSGR1_104-e/Docs/R1-2101225.zip R1-2101225Type A PUSCH repetitions for Msg3. docx[retrieved on Jan. 19, 2021], Section 2.2, p. 2.

Vivo: "Discussion on Coverage Enhancements for Channels Other than PUCCH and PUSCH", 3GPP TSG RAN WG1 #103-e, R1-2007682, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26-Nov. 13, 2020, Oct. 17, 2020 (Oct. 17, 2020), 5 Pages, XP051939839, Retrieved from the Internet: URL: https://ftp.3gpp.org/tsg_ran/WG1_RL1/TSGR1_103-e/Docs/R1-2007682.zip, R1-2007682.docx [retrieved on Oct. 17, 2020], Section 2.1, p. 2-p. 3, The whole document.

* cited by examiner

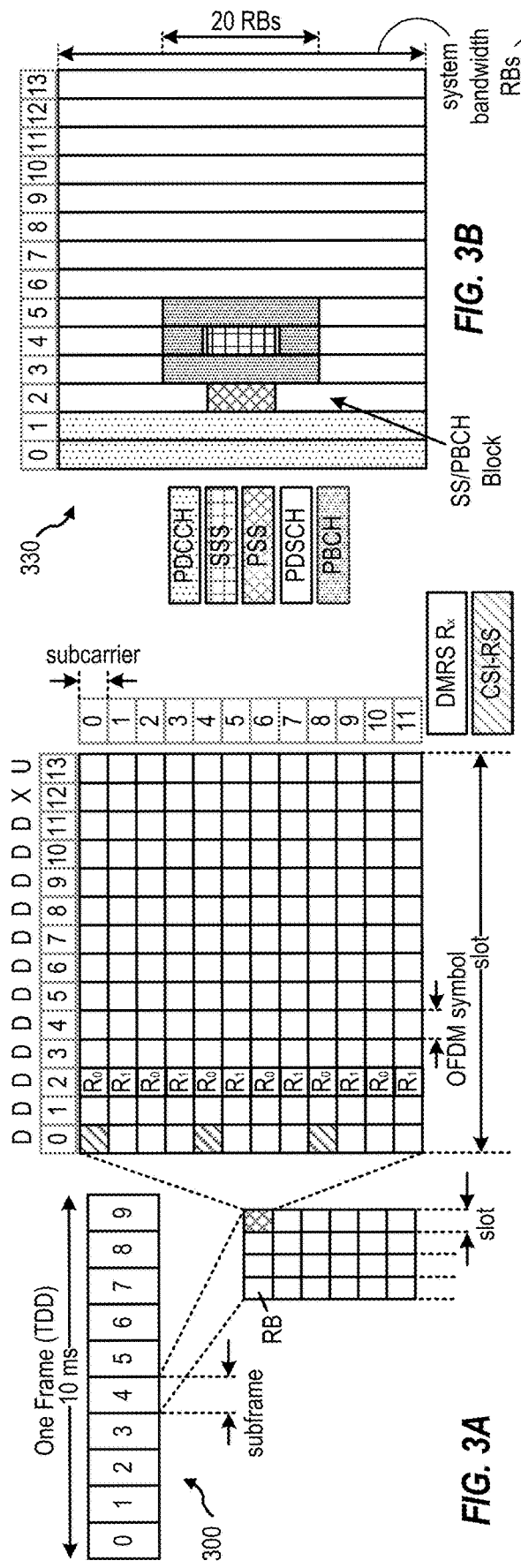
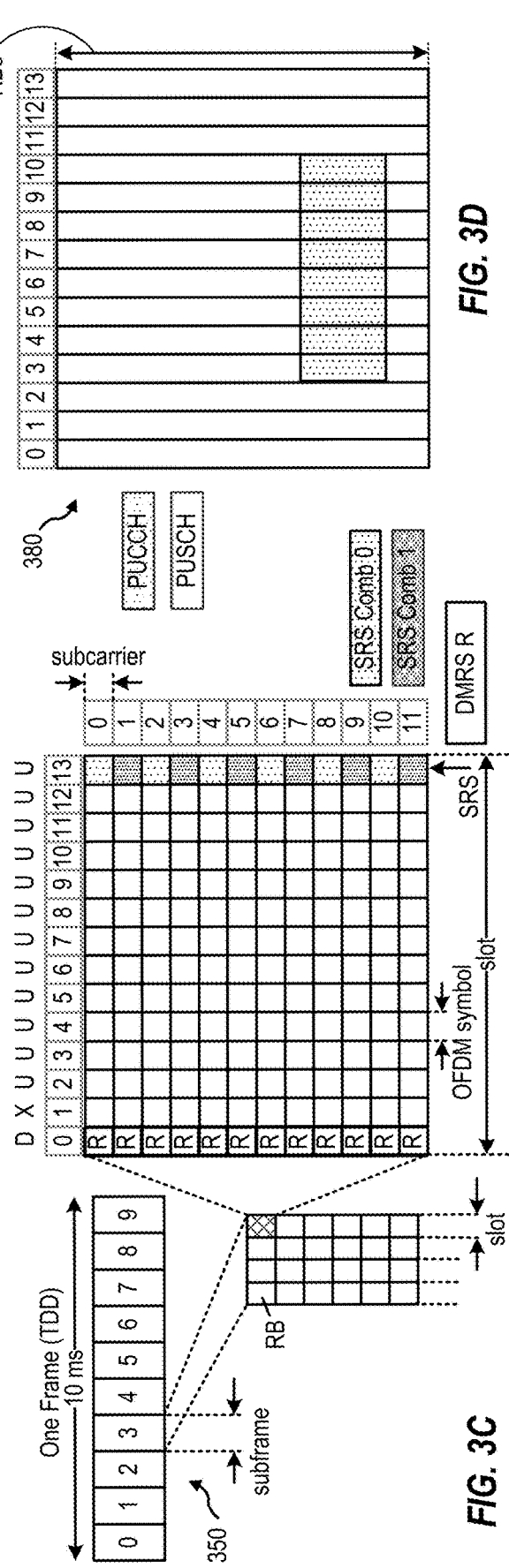

TECHNIQUES FOR CHANNEL REPETITION COUNTING

CROSS-REFERENCE TO RELATED APPLICATIONS

This application claims benefit of U.S. Provisional Patent Application Ser. No. 63/140,823, filed Jan. 23, 2021, which is assigned to the assignee hereof and hereby expressly incorporated by reference herein.

INTRODUCTION

Aspects of the present disclosure relate to wireless communications, and more particularly, to techniques for channel repetition.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides an apparatus for wireless communication. The apparatus generally includes a memory and a processor coupled to the memory. The processor is configured to receive a first indication of one or more first slots that are counted for one or more repetitions of a random access channel (RACH) message and a second indication of a number of the one or more repetitions, each of the one or more repetitions of the RACH message being during a slot available for uplink communication, and transmit, to a base station, the RACH message and the one or more repetitions in accordance with the first indication and the second indication.

One aspect provides an apparatus for wireless communication. The apparatus generally includes a memory and a processor coupled to the memory. The processor is configured to transmit a first indication of one or more first slots that are counted for one or more repetitions of a random access channel (RACH) message and a second indication of a number of the one or more repetitions, each of the one or more repetitions of the RACH message being during a slot available for uplink communication, and receive, from a user equipment (UE), at least one of the RACH message or the one or more repetitions in accordance with the first indication and the second indication.

One aspect provides a method for wireless communication by a UE. The method generally includes receiving a first indication of one or more first slots that are counted for one or more repetitions of a random access channel (RACH) message and a second indication of a number of the one or more repetitions, each of the repetitions of the RACH message being during a slot available for uplink communication; and transmitting, to a base station, the RACH message and the one or more repetitions in accordance with the first indication and the second indication.

One aspect provides a method for wireless communication by a base station. The method generally includes transmitting a first indication of one or more first slots that are counted for one or more repetitions of a random access channel (RACH) message and a second indication of a number of the one or more repetitions, each of the one or more repetitions of the RACH message being during a slot available for uplink communication; and receiving, from a user equipment (UE), at least one of the RACH message or the one or more repetitions in accordance with the first indication and the second indication.

One aspect provides an apparatus for wireless communication. The apparatus generally includes means for receiving a first indication of one or more first slots that are counted for one or more repetitions of a random access channel (RACH) message and a second indication of a number of the one or more repetitions, each of the repetitions of the RACH message being during a slot available for uplink communication; and means for transmitting, to a base station, the RACH message and the one or more repetitions in accordance with the first indication and the second indication.

One aspect provides an apparatus for wireless communication. The apparatus generally includes means for transmitting a first indication of one or more first slots that are counted for one or more repetitions of a random access channel (RACH) message and a second indication of a number of the one or more repetitions, each of the one or more repetitions of the RACH message being during a slot available for uplink communication; and means for receiving, from a user equipment (UE), at least one of the RACH message or the one or more repetitions in accordance with the first indication and the second indication.

One aspect provides a non-transitory computer-readable having instructions stored thereon to cause a UE to: receive a first indication of one or more first slots that are counted for one or more repetitions of a random access channel (RACH) message and a second indication of a number of the one or more repetitions, each of the repetitions of the RACH message being during a slot available for uplink communication; and transmit, to a base station, the RACH message and the one or more repetitions in accordance with the first indication and the second indication.

One aspect provides a non-transitory computer-readable having instructions stored thereon to cause a base station to: transmit a first indication of one or more first slots that are counted for one or more repetitions of a random access channel (RACH) message and a second indication of a number of the one or more repetitions, each of the one or more repetitions of the RACH message being during a slot available for uplink communication; and receive, from a user equipment (UE), at least one of the RACH message or the one or more repetitions in accordance with the first indication and the second indication.

One aspect provides a method for wireless communication by a user-equipment (UE). The method generally includes: determining a configuration of a number of repetitions of a channel to be transmitted using a random access channel (RACH) message, each of the repetitions of the channel being during a slot available for uplink (UL), wherein the number of repetitions corresponds to a number of the available slots to be used for the repetitions; and transmitting, to a base station, the RACH message in accordance with the configuration of the number of repetitions.

One aspect provide a method for wireless communication by a user-equipment (UE). The method generally includes: receiving, from a base station, an indication of a repetition counting technique; determining a configuration of a number of repetitions of a channel to be transmitted using a random access channel (RACH) message, each of the repetitions of the channel being during a slot available for uplink (UL); selecting the available slots to be used for the repetitions based on the repetition counting technique and the configuration of the number of repetitions; and transmitting, to the base station, the RACH message in accordance with the selection of the available slots.

One aspect provide a method for wireless communication by a base station. The method generally includes: determining a configuration of a number of repetitions of a channel to be received using a random access channel (RACH) message, each of the repetitions of the channel being during a slot available for uplink (UL), wherein the number of repetitions corresponds to a number of the available slots to be used for the repetitions; and receiving, from a user-equipment (UE), the RACH message in accordance with the configuration of the number of repetitions.

One aspect provide a method for wireless communication by a base station. The method generally includes: transmitting, to a user-equipment (UE), an indication of a repetition counting technique; determining a configuration of a number of repetitions of a channel to be received using a random access channel (RACH) message, each of the repetitions of the channel being during a slot available for uplink (UL); selecting the available slots to be used for the repetitions based on the repetition counting technique and the configuration of the number of repetitions; and receiving, from the UE, the RACH message in accordance with the selection of the available slots.

One aspect provides an apparatus for wireless communication by a user-equipment (UE). The apparatus generally includes a memory and one or more processors coupled to the memory, the one or more processors and the memory being configured to: determine a configuration of a number of repetitions of a channel to be transmitted using a random access channel (RACH) message, each of the repetitions of the channel being during a slot available for uplink (UL), wherein the number of repetitions corresponds to a number of the available slots to be used for the repetitions; and transmit, to a base station, the RACH message in accordance with the configuration of the number of repetitions.

One aspect provides an apparatus for wireless communication by a user-equipment (UE). The apparatus generally includes a memory and one or more processors coupled to the memory, the one or more processors and the memory being configured to: receive, from a base station, an indication of a repetition counting technique; determine a configuration of a number of repetitions of a channel to be transmitted using a random access channel (RACH) message, each of the repetitions of the channel being during a slot available for uplink (UL); select the available slots to be used for the repetitions based on the repetition counting technique and the configuration of the number of repetitions; and transmitting, to the base station, the RACH message in accordance with the selection of the available slots.

One aspect provides an apparatus for wireless communication by a base station. The apparatus generally includes a memory and one or more processors coupled to the memory, the one or more processors and the memory being configured to: determine a configuration of a number of repetitions of a channel to be received using a random access channel (RACH) message, each of the repetitions of the channel being during a slot available for uplink (UL), wherein the number of repetitions corresponds to a number of the available slots to be used for the repetitions; and receive, from a user-equipment (UE), the RACH message in accordance with the configuration of the number of repetitions.

One aspect provides an apparatus for wireless communication by a base station. The apparatus generally includes a memory and one or more processors coupled to the memory, the one or more processors and the memory being configured to: transmit, to a user-equipment (UE), an indication of a repetition counting technique; determine a configuration of a number of repetitions of a channel to be received using a random access channel (RACH) message, each of the repetitions of the channel being during a slot available for uplink (UL); select the available slots to be used for the repetitions based on the repetition counting technique and the configuration of the number of repetitions; and receive, from the UE, the RACH message in accordance with the selection of the available slots.

One aspect provides an apparatus for wireless communication by a user-equipment (UE). The apparatus generally includes: means for determining a configuration of a number of repetitions of a channel to be transmitted using a random access channel (RACH) message, each of the repetitions of the channel being during a slot available for uplink (UL), wherein the number of repetitions corresponds to a number of the available slots to be used for the repetitions; and means for transmitting, to a base station, the RACH message in accordance with the configuration of the number of repetitions.

One aspect provide an apparatus for wireless communication by a user-equipment (UE). The apparatus generally includes: means for receiving, from a base station, an indication of a repetition counting technique; means for determining a configuration of a number of repetitions of a channel to be transmitted using a random access channel (RACH) message, each of the repetitions of the channel being during a slot available for uplink (UL); means for selecting the available slots to be used for the repetitions based on the repetition counting technique and the configuration of the number of repetitions; and means for transmitting, to the base station, the RACH message in accordance with the selection of the available slots.

One aspect provide an apparatus for wireless communication by a base station. The apparatus generally includes: means for determining a configuration of a number of repetitions of a channel to be received using a random access channel (RACH) message, each of the repetitions of the channel being during a slot available for uplink (UL), wherein the number of repetitions corresponds to a number of the available slots to be used for the repetitions; and means for receiving, from a user-equipment (UE), the RACH message in accordance with the configuration of the number of repetitions.

One aspect provide an apparatus for wireless communication by a base station. The apparatus generally includes: means for transmitting, to a user-equipment (UE), an indication of a repetition counting technique; means for determining a configuration of a number of repetitions of a channel to be received using a random access channel (RACH) message, each of the repetitions of the channel being during a slot available for uplink (UL); means for selecting the available slots to be used for the repetitions based on the repetition counting technique and the configuration of the number of repetitions; and means for receiving, from the UE, the RACH message in accordance with the selection of the available slots.

One aspect provides a non-transitory computer-readable having instructions stored thereon to cause a user-equipment (UE) to: determine a configuration of a number of repetitions of a channel to be transmitted using a random access channel (RACH) message, each of the repetitions of the channel being during a slot available for uplink (UL), wherein the number of repetitions corresponds to a number of the available slots to be used for the repetitions; and transmit, to a base station, the RACH message in accordance with the configuration of the number of repetitions.

One aspect provides a non-transitory computer-readable having instructions stored thereon to cause a user-equipment (UE) to: receive, from a base station, an indication of a repetition counting technique; determine a configuration of a number of repetitions of a channel to be transmitted using a random access channel (RACH) message, each of the repetitions of the channel being during a slot available for uplink (UL); select the available slots to be used for the repetitions based on the repetition counting technique and the configuration of the number of repetitions; and transmit, to the base station, the RACH message in accordance with the selection of the available slots.

One aspect provides a non-transitory computer-readable having instructions stored thereon to cause a base station to: determine a configuration of a number of repetitions of a channel to be received using a random access channel (RACH) message, each of the repetitions of the channel being during a slot available for uplink (UL), wherein the number of repetitions corresponds to a number of the available slots to be used for the repetitions; and receive, from a user-equipment (UE), the RACH message in accordance with the configuration of the number of repetitions.

One aspect provides a non-transitory computer-readable having instructions stored thereon to cause a base station to: transmit, to a user-equipment (UE), an indication of a repetition counting technique; determine a configuration of a number of repetitions of a channel to be received using a random access channel (RACH) message, each of the repetitions of the channel being during a slot available for uplink (UL); select the available slots to be used for the repetitions based on the repetition counting technique and the configuration of the number of repetitions; and receive, from the UE, the RACH message in accordance with the selection of the available slots.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Figure 1:
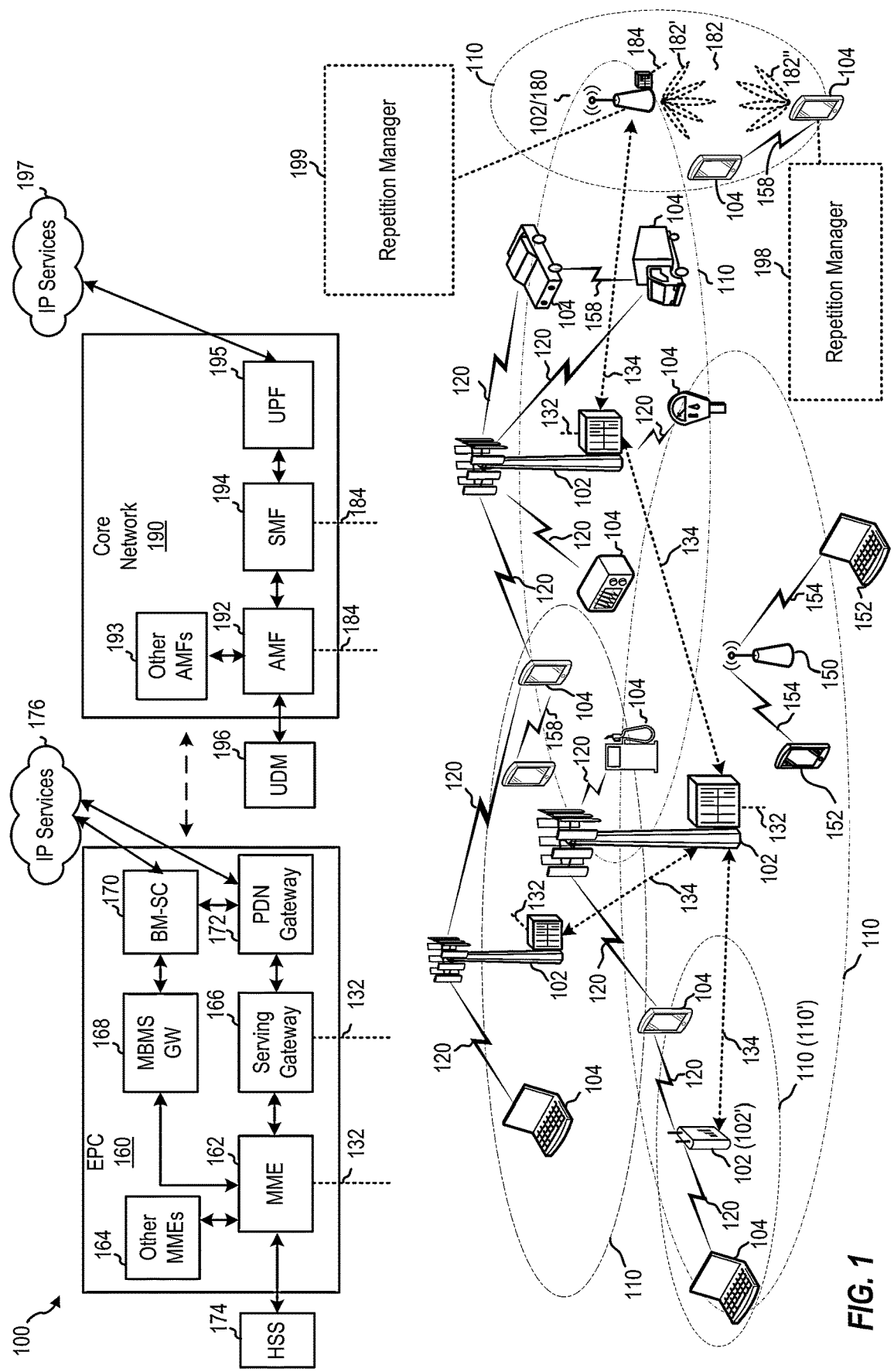
FIG. 1 is a block diagram conceptually illustrating an example wireless communication network.

Aspects of the present disclosure provide apparatuses, methods, processing systems, and computer readable mediums for channel repetition.

In certain cases, a user equipment (UE) may be configured to transmit certain information (e.g., data and/or control signaling) with repetitions for coverage enhancements. For example, a receiver (e.g., a base station) may combine the repetitions from the UE to enhance the signal quality of the received signals associated with the repeated information. In determining the time domain resources for repetitions of the information, the UE may be expected to count every slot beginning from the slot of the first transmission as a potential slot for a repetition, irrespective of whether the slot is configured for downlink or uplink communications. Counting repetitions in this manner can lead to counting downlink resources and a shortfall in actual repetitions transmitted by the UE. The UE will not use the downlink resources for transmission of repetitions despite the downlink resources being counted for such. For example, the UE may be configured to transmit three repetitions, where the two slots following the first transmission are for downlink communications rather than uplink communications. The UE will count the downlink slots towards the repetition number but not use the downlink slots for the repetitions. In such a scenario, the UE may only transmit the first transmission without the other two repetitions as the downlink slots can be counted as slots for the repetitions and not used for repetitions.

One or more aspects of the present disclosure provide techniques and apparatus for selecting certain slots available for uplink communication as slots used for repetitions of an uplink transmission, for example, according to an indication of the slots available for uplink communication. For example, the UE may receive indications of the slots that can be counted for repetitions of an uplink transmission and the number of repetitions. According to one or more examples, the UE may select the slots used for repetitions based on the slots available for uplink communication. In certain aspects, the slot selection for repetitions described herein may be used specifically for a particular random access channel (RACH) message (e.g., MSG3) in a four-step RACH procedure, for example, as further described herein with respect to FIGS. 4 and 8. For example, the UE may transmit repetitions of MSG3 in a RACH procedure according to the slot selection for repetitions described herein.

The slot selection for repetitions described herein may facilitate desirable wireless communication performance, such as reduced latencies and/or increased throughput, for example, due to the repetitions facilitating decoding of a channel at a receiver, for example, by combining the repetitions at the receiver (e.g., a base station) to enhance the signal quality of the channel. In certain aspects, the slot selection for repetitions described herein may facilitate enhanced coverage for a particular RACH message (e.g., MSG3), for example, due to the repetitions of the RACH message. The coverage enhancement may enable a UE to communicate at a reduced power and/or at a cell's edge, for example.

In certain aspects, the repetition of a transmission and/or a channel generally refers to a transmitter (e.g., a UE) transmitting two or more repetitions of a transmission or a channel, allowing a receiver (e.g., a base station) to combine the repetitions to facilitate decoding of the channel. In certain aspects, each repetition of the channel may include the same information or data. The receiver is able to combine the repetitions to decode the information or data associated with the channel or transmission. In some aspects, the repetitions may include the same information or data with different redundancy versions. For example, the same information or data may be encoded differently for the repetitions using different redundancy versions.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communications system 100 includes a repetition manager 199, which may be configure a UE for repetition of a data channel for random access. The repetition manager 199 may provide an indication of the slots available for uplink communication, which can be counted for repetitions of the data channel. Wireless communications system 100 further includes a repetition manager 198, which may be configured to implement data channel repetition for random access. The repetition manager 198 may select slots for repetitions of the data channel based on the indication of the slots available for uplink communication.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some cases, a base station including components that are located at various physical locations may be referred to as or may be associated with a disaggregated radio access network (RAN) architecture, such as an Open RAN (O-RAN) or Virtualized RAN (VRAN) architecture. In some cases, a base station may be a network node including one or more of a central unit (CU), a distributed unit (DU), or a radio unit (RU).

Figure 2:
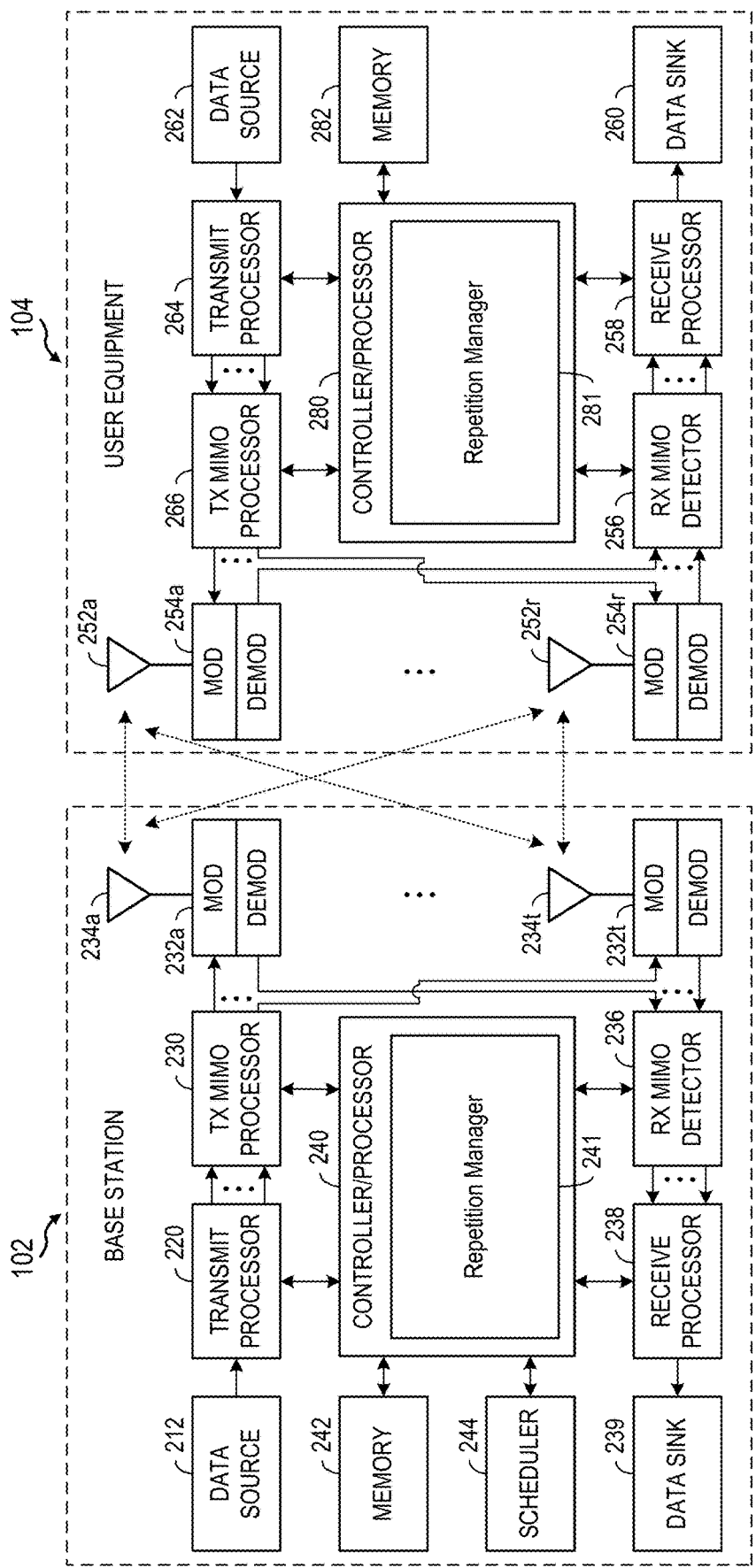
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a repetition manager 241, which may be representative of repetition manager 199 of FIG. 1. Notably, while depicted as an aspect of controller/processor 240, repetition manager 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 104 includes controller/processor 280, which may be configured to implement various functions related to wireless communications. In the depicted example, controller/processor 280 includes repetition manager 281, which may be representative of repetition manager 198 of FIG. 1. Notably, while depicted as an aspect of controller/processor 280, repetition manager 281 may be implemented additionally or alternatively in various other aspects of user equipment 104 in other implementations.

FIGS. 3A-3D depict aspects of data structures for a wireless communication network, such as wireless communications system 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe. According to aspects of the present disclosure the UE may select slots, as depicted in FIGS. 3A-3D, for repetitions of a transmission using slots available for uplink communication, as further described herein.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations-FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Example RACH Power Control Procedure

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival (e.g., data transmission) when the UE is in RRC idle or RRC inactive modes, and when reestablishing a connection with the network.

Figure 4:
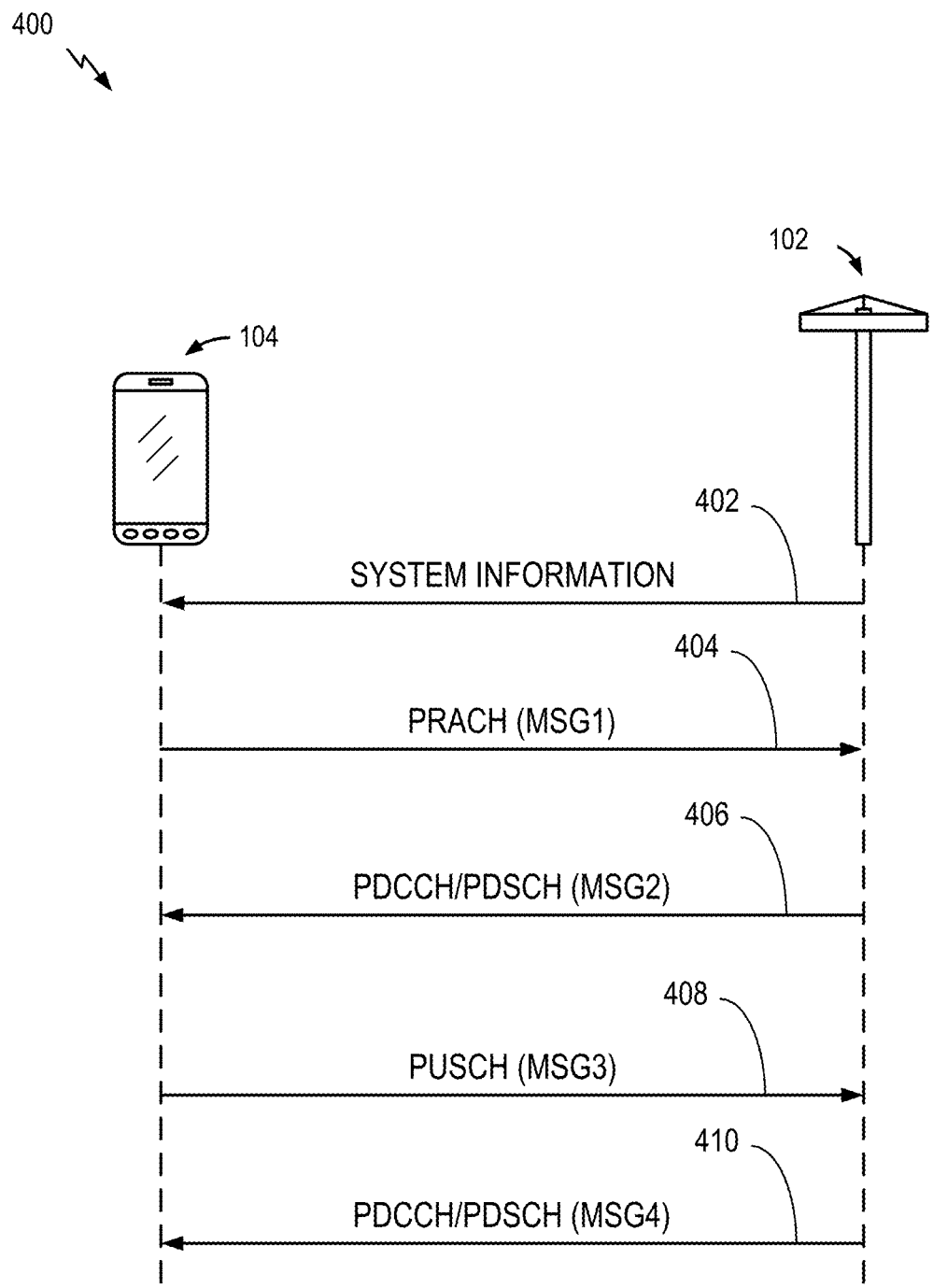
FIG. 4 is a call-flow diagram illustrating an example four-step random access channel (RACH) procedure, in accordance with certain aspects of the present disclosure.

FIG. 4 is a call-flow diagram 400 illustrating an example four-step RACH procedure, in accordance with certain aspects of the present disclosure. A first message (MSG1) may be sent from the UE 104 to BS 102 on the physical random access channel (PRACH). In this case, MSG1 may only include a RACH preamble 404. BS 102 may respond with a random access response (RAR) message 406 (MSG2) which may include the identifier (ID) of the RACH preamble, a timing advance (TA), an uplink grant, cell radio network temporary identifier (C-RNTI), and a back off indicator (BI). MSG2 may include a PDCCH communication including control information for (e.g., scheduling a reception of) a following communication on the PDSCH, as illustrated. In response to MSG2, MSG3 is transmitted from the UE 104 to BS 102 on the PUSCH 408. MSG3 may include one or more of an RRC connection request, a tracking area update request, a system information request, a positioning fix or positioning signal request, or a scheduling request. The BS 102 then responds with MSG4 which may include a contention resolution message 410. In some cases, the UE 104 may also receive system information 402 (e.g., also referred to herein as a system information message) indicating various communication parameters that may be used by the UE 104 for communicating with the BS 102.

Aspects Related to Channel Repetition

Some aspects of the present disclosure provide techniques for counting MSG3 physical uplink shared channel (PUSCH) repetitions. The techniques for counting the repetitions described herein may be different than certain techniques (e.g., a repetition counting technique for 3GPP Release-15). For example, in some aspects of the present disclosure, data channel repetition may be implemented using dynamically configured repetition counting techniques. For example, according to one or more aspects, a base station may configure a UE with a number of repetitions of a transmission. Each of the repetitions may be transmitted by the UE during a slot configured for uplink (UL). As an example of a first repetition counting technique, the UE may count every slot available for either downlink (DL) or UL communication. On the other hand, according to one or more aspects, as an example of a second repetition counting technique, the UE may count only the slots available for UL transmissions, as described in more detail herein. In some aspects of the present disclosure, a BS may dynamically configure a UE with a repetition counting technique to be used for repetition of a PUSCH for a RACH message.

In some implementations, repetition may be implemented for PUSCH transmission (e.g., PUSCH 408 of FIG. 4) for MSG3 of a RACH procedure to enhance coverage. Repetition of a channel generally refers to a technique where multiple repetitions of a channel are transmitted, allowing a receiver to combine the repetitions to facilitate decoding of the channel. In certain aspects, each repetition of the channel may include the same data. Thus, the receiver is able to combine the repetitions to decode the data associated with the channel. In some aspects, the repetitions may include the same data, yet different redundancy versions. For example, the same data may be encoded differently for the repetitions using different redundancy versions.

Figure 5A:
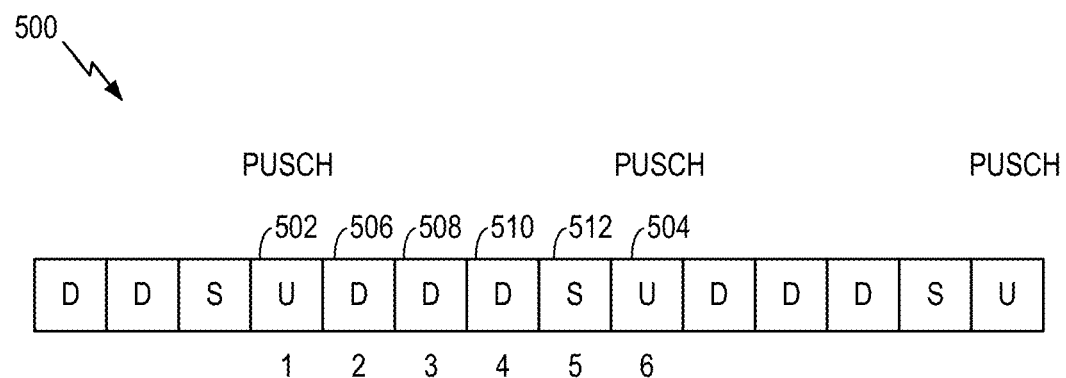
FIGS. 5A and 5B illustrate repetition counting techniques, in accordance with certain aspects of the present disclosure.

In certain cases, for a unicast PUSCH transmission, when a UE is configured with repetition of PUSCH, the UE is expected to count every slot beginning from the slot of first transmission as a potential slot for a repetition, irrespective of whether the slot is designated for downlink (DL) or uplink (UL), as described in more detail with respect to FIG. 5A.

Figure 5B:
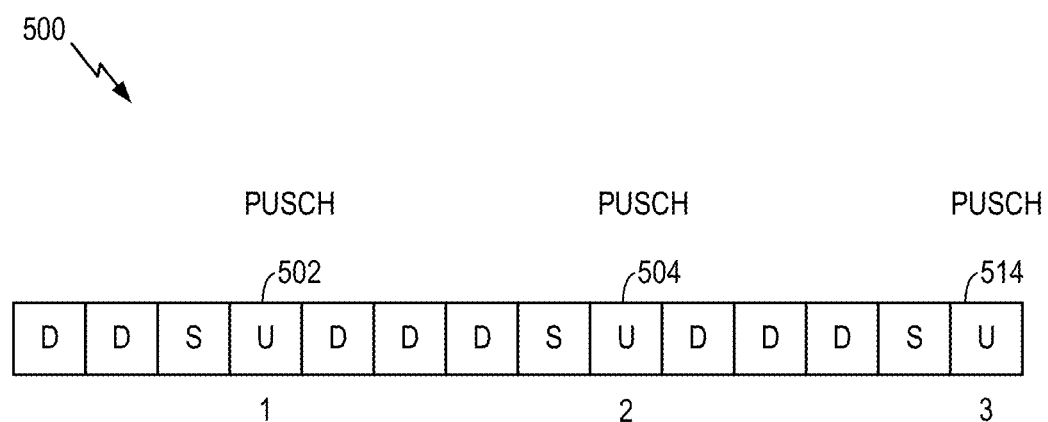

FIGS. 5A and 5B illustrate repetition counting techniques, in accordance with certain aspects of the present disclosure. As illustrated, the slots 500 include special (S) slots that are used to facilitate switching from a DL slot to an UL slot. In some cases, a repetition count of 6 (also referred to herein a number of repetitions) may be configured at a UE. Based on the repetition count, the UE may count each of the slots (e.g., each of the slots in a sequence of consecutive slots) beginning from the slot of the first PUSCH transmission as a potential slot for a repetition. For example, the UE may begin the count at slot 502 (e.g., UL slot) during which the initial PUSCH may be transmitted, and the UE may also count each of slots 506, 508, 510, 512, and 504, even though the repetition of the PUSCH is only transmitted in the UL slots 502, 504. Counting repetitions in this manner can lead to over counting and a large shortfall in actual repetitions since all slots are counted (e.g., including DL slots on which PUSCH cannot be transmitted).

For unicast uplink communication, some configuration changes by the network may occur in a dynamic manner that modify the frame slot pattern (e.g., drop one or more UL slots from the frame) at the UE. For example, a repetition count may be configured prior to slot 502. After the repetition count is configured, one or more UL slots may be dynamically reconfigured (e.g., added and/or dropped from the slot pattern). In certain cases, for unicast communication, the UE may count every slot (including DL, UL, and S slots) for the repetition count, as described herein. In some cases (e.g., for a RACH procedure), dynamic reconfiguration of a slot pattern by the network may not occur (or may be less likely to occur or occur infrequently). In some aspects of the present disclosure, a BS may dynamically configure a UE with a repetition counting technique to be applied for a configured repetition count. For instance, the UE may only count the available slots for PUSCH (e.g., slots 502, 504) for the PUSCH repetition. For example, as illustrated in FIG. 5B, a repetition count of 3 may be configured, and the UE may count only the slots 502, 504, 514 available for UL communication. The UE may transmit the PUSCH in the corresponding slots 502, 504, 514, where the slot 502 may be for the initial transmission and the slots 504, 514 may be for the repetitions of the initial transmission.

Figure 6:
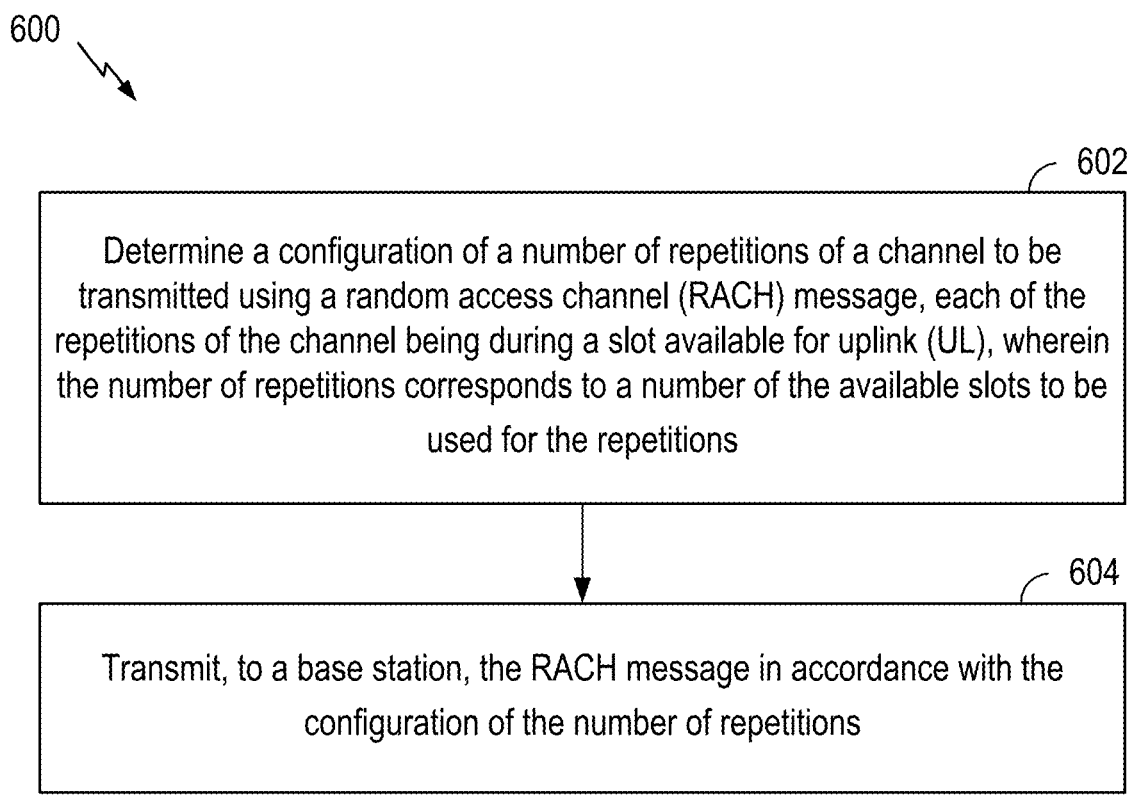
FIG. 6 is a flow diagram illustrating example operations for wireless communication, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., such as the UE 104 in the wireless communication system 100). The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 602, with the UE determining a configuration of a number of repetitions of a channel (e.g., PUSCH) to be transmitted using a RACH message (e.g., MSG3 as described with respect to FIG. 4). For example, the UE may receive, from the base station, the configuration of the number of repetitions. Each of the repetitions of the channel may be during a slot available for UL (e.g., slots 502, 504, 514 of FIG. 5B). In some aspects, the number of repetitions may correspond to a number of the available slots to be used for the repetitions. In other words, the repetition counting technique associated the configured number of repetitions may be to count only the slots available for UL, as described.

At block 604, the UE may transmit, to a base station, the RACH message in accordance with the configuration of the number of repetitions. In some aspects, the UE may transmit a random access preamble (e.g., MSG1 of FIG. 4), and receive a random access response (e.g., MSG2 of FIG. 4) to the random access preamble. The RACH message (e.g., MSG3 of FIG. 4) may be transmitted in response to receiving the random access response.

In some aspects, the UE may also receive an indication of a repetition counting technique, and select the available slots to be used for the repetitions based on the repetition counting technique and the configuration of the number of repetitions. For example, the indication of the repetition counting technique may include an indication to count only the available slots (e.g., UL slots 502, 504, 514) for the selecting of the available slots to be used for the repetitions, or an indication to count both the available slots (e.g., UL slots 502, 504, 514) and one or more other slots (e.g., 506, 508, 510, 512) that are unavailable for UL for the selecting of the available slots to be used for the repetitions.

Figure 7:
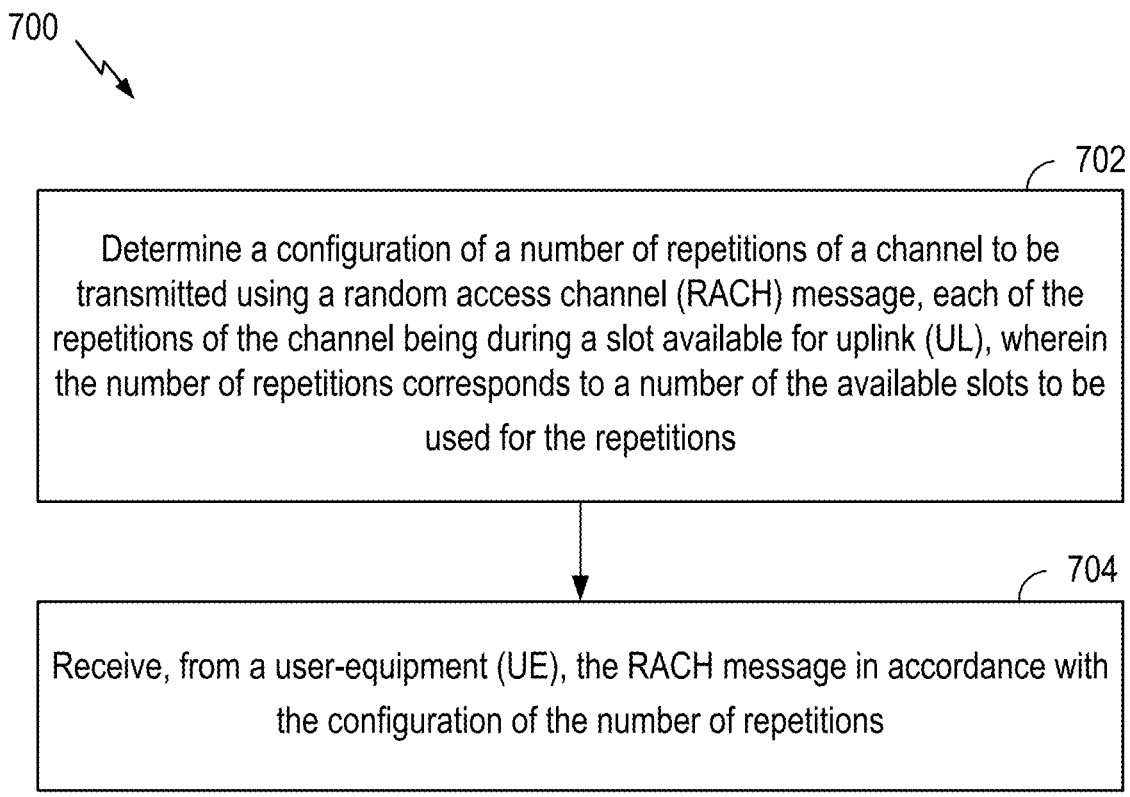
FIG. 7 is a flow diagram illustrating example operations for wireless communication, in accordance with certain aspects of the present disclosure.

FIG. 7 is a flow diagram illustrating example operations 700 for wireless communication, in accordance with certain aspects of the present disclosure. The operations 700 may be performed, for example, by a BS (e.g., such as the BS 102 in the wireless communications system 100). The operations 700 may be complementary to the operations 600 performed by the UE. The operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 may optionally begin, at block 702, where the BS may determine a configuration of a number of repetitions of a channel (e.g., PUSCH) to be received using a RACH message (e.g., MSG3 as described with respect to FIG. 4). In some aspects, the BS may transmit, to the UE, the configuration of the number of repetitions for the RACH message. Each of the repetitions of the channel may be during a slot available for UL (e.g., slots 502, 504, 514 of FIG. 5B). In some aspects, the number of repetitions may correspond to a number of the available slots to be used for the repetitions.

At block 704, the BS may receive, from the UE, the RACH message in accordance with the configuration of the number of repetitions. For example, the BS may decode the RACH message by combining the repetitions of the channel. The combined repetitions at the receiver may enhance the signal quality of the received signals associated with the RACH message.

Figure 8:
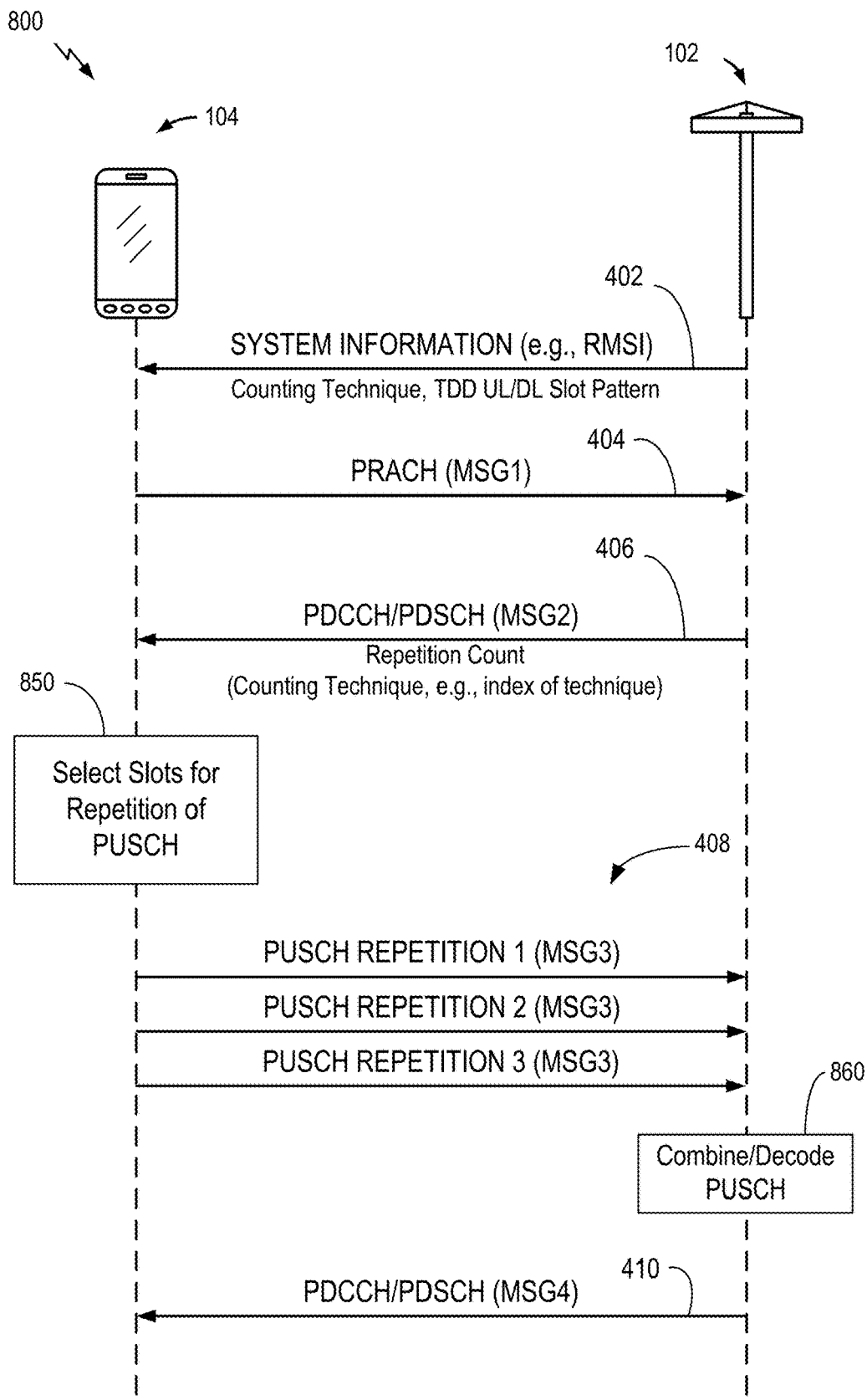
FIG. 8 is a call flow diagram illustrating example techniques for physical uplink shared channel (PUSCH) repetition during a RACH procedure, in accordance with certain aspects of the present disclosure.

FIG. 8 is a call flow diagram illustrating example techniques for PUSCH repetition during a RACH procedure 800, in accordance with certain aspects of the present disclosure. In some aspects, for MSG3 PUSCH repetition, counting the number of repetitions may be on the basis of available UL slots, as described. For example, a BS may indicate to the UE which technique for counting the number of MSG3 PUSCH repetitions is to be used. For instance, the BS may indicate the technique (also referred to herein as a repetition counting technique as described herein with respect to FIGS. 5A and 5B) of counting MSG3 PUSCH repetitions via system information 402 (e.g. via remaining minimum system information (RMSI)), as illustrated. In some cases, the RMSI may indicate the TDD UL/DL slot pattern, which identifies where DL slot(s), UL slot(s), and/or S slot(s) are arranged in the time domain, such as the UL/DL slot pattern depicted in FIGS. 5A and 5B.

As described with respect to FIG. 4, after MSG1, the BS may transmit a physical downlink control channel (PDCCH) that schedules a physical downlink shared channel (PDSCH) for MSG2. In some aspects, the BS may indicate the technique of counting MSG3 PUSCH repetitions via MSG2 (e.g., PDSCH of MSG2), MSG2 PDCCH, or both, as illustrated. The indication of the repetition counting technique (e.g., in MSG2) may be together and/or combined with the indication of the number of MSG3 repetitions. For example, MSG2 PDCCH may indicate the repetition counting technique, whether PUSCH repetition is to be enabled, the number repetitions to be transmitted, or any combination thereof. As illustrated, once the UE receives MSG2, at block 850, the UE may select the slots for repetition of the PUSCH on MSG3 based on the number of repetitions configured, and the configured repetition counting technique. The UE may then transmit the PUSCH repetitions 408 (e.g., the repetitions of MSG3 via the PUSCH), as illustrated. At block 860, the BS may combine the repetitions of the PUSCH, and decode the PUSCH accordingly.

In some aspects, the UE may be configured with various options (e.g., also referred to as candidates) for the techniques of MSG3 repetition counting. For example, the candidate techniques may be specified in a standard specification. In such a case, the BS indicating the repetition counting technique may include indicating one of the configured candidate techniques. For example, the BS may indicate an index associated with one of the candidate techniques.

In some aspects, the candidate techniques for MSG3 repetition counting may be implied from (e.g., depend on) one or more other configurations. For example, the candidate techniques may be determined by the UE from an UL/DL duplexing method used for communication between the UE and the BS (e.g., frequency division duplex (FDD) or time division duplex (TDD)). In some aspects, the candidate techniques may be implied from (e.g., depend on) a frequency range, subcarrier spacing, or both, configured for communications with the BS. The duplexing method, frequency range, and subcarrier spacing may be configured via the system information 402, in some implementations.

Figure 9:
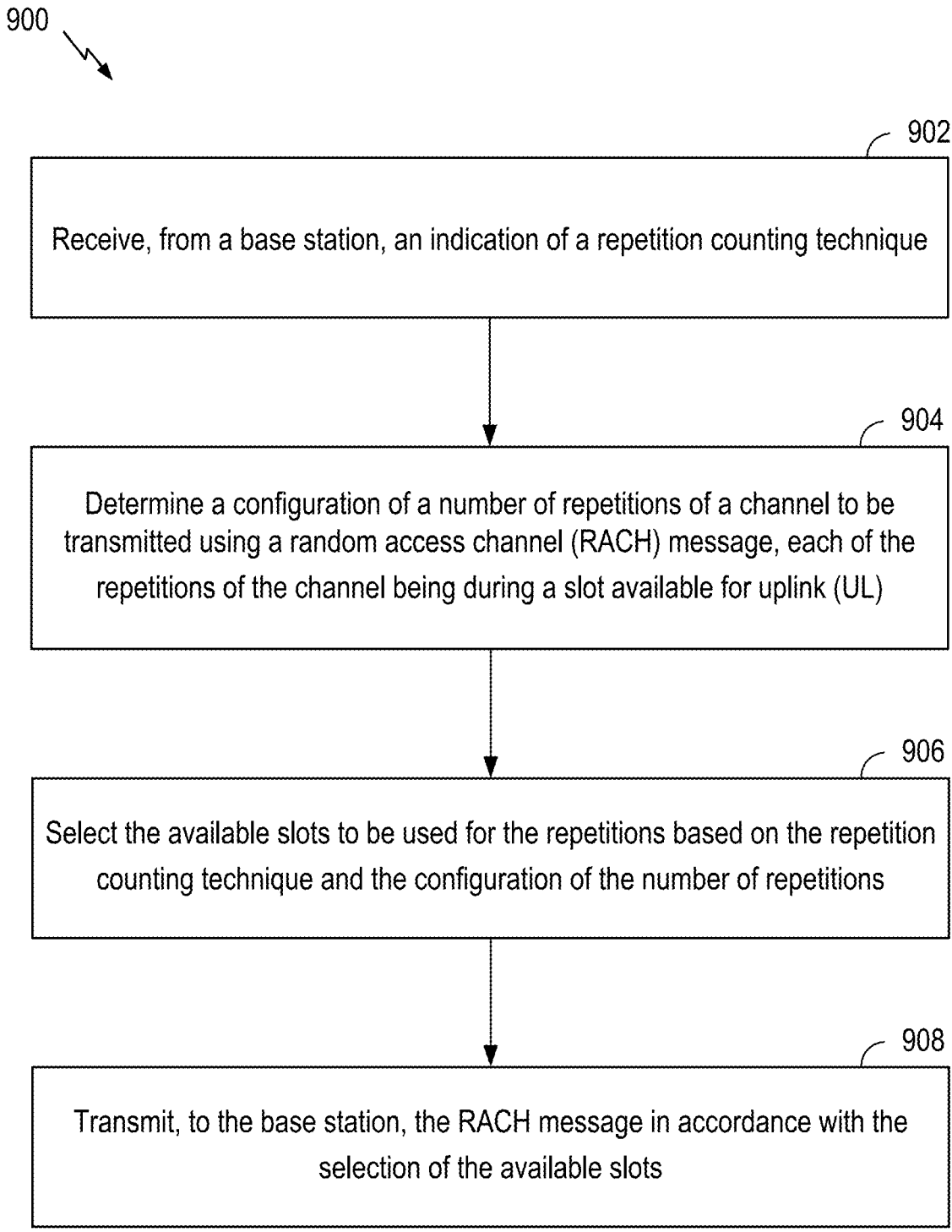
FIG. 9 is a flow diagram illustrating example operations for wireless communication, in accordance with certain aspects of the present disclosure.

FIG. 9 is a flow diagram illustrating example operations 900 for wireless communication, in accordance with certain aspects of the present disclosure. The operations 900 may be performed, for example, by a UE (e.g., such as the UE 104 in the wireless communication system 100). The operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may optionally begin, at block 902, with the UE receiving, from a base station, an indication of a repetition counting technique. For example, the indication of the repetition counting technique may include an indication to count only available slots for selecting of the available slots to be used for the repetitions, or an indication to count both the available slots and one or more other slots that are unavailable for UL for the selecting of the available slots to be used for the repetitions. In some aspects, the indication of the repetition counting technique comprises an indication of one of candidate repetition counting techniques, as described.

At block 904, the UE may determine a configuration of a number of repetitions of a channel to be transmitted using a RACH message (e.g., MSG3), each of the repetitions of the channel being during a slot available for UL. At block 906, the UE may select the available slots to be used for the repetitions based on the repetition counting technique and the configuration of the number of repetitions. At block 908, the UE may transmit, to the base station, the RACH message in accordance with the selection of the available slots.

Figure 10:
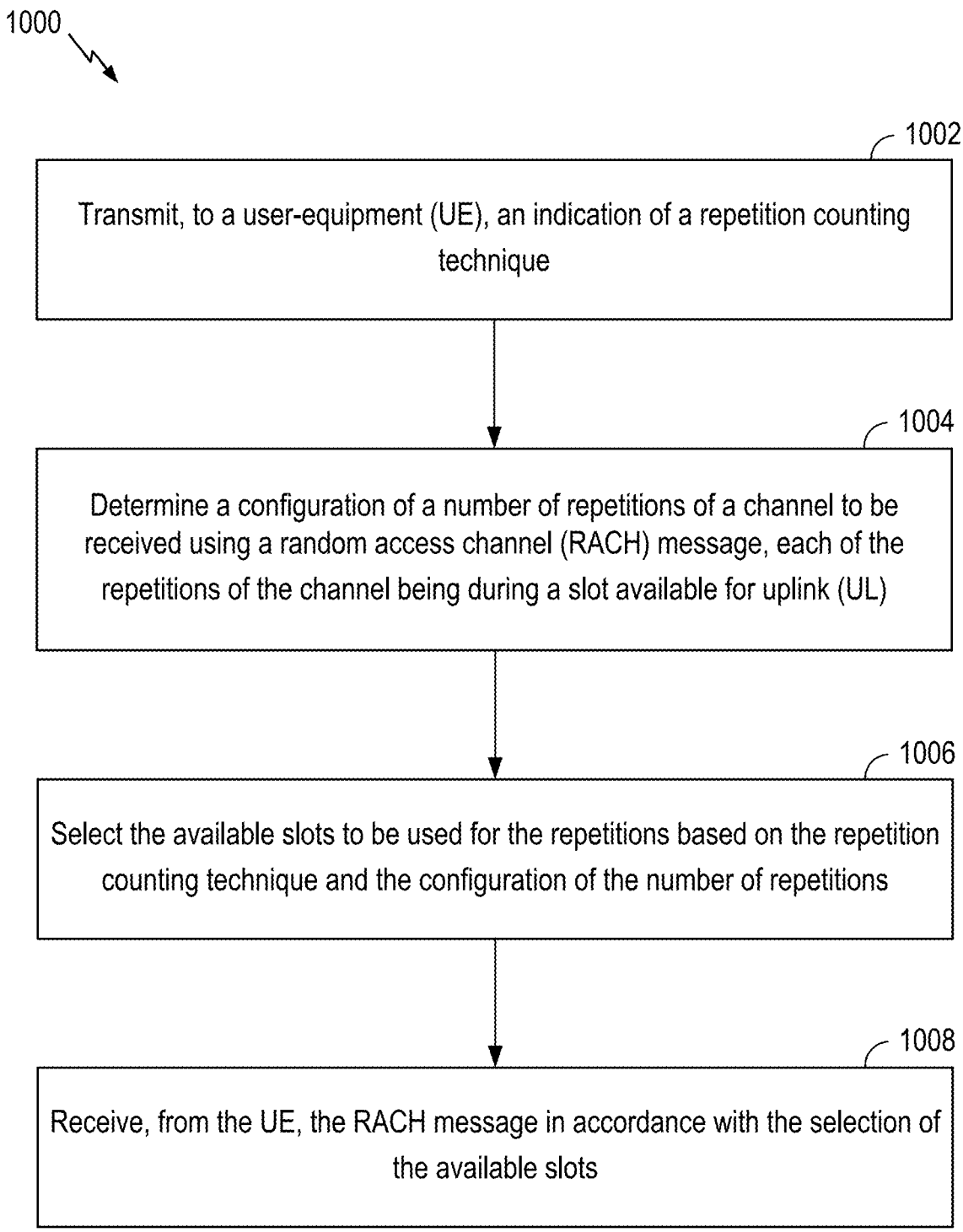
FIG. 10 is a flow diagram illustrating example operations for wireless communication, in accordance with certain aspects of the present disclosure.

FIG. 10 is a flow diagram illustrating example operations 1000 for wireless communication, in accordance with certain aspects of the present disclosure. The operations 1000 may be performed, for example, by a BS (e.g., such as the BS 102 in the wireless communications system 100). The operations 1000 may be complementary to the operations 900 performed by the UE. The operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 may optionally begin, at block 1002, with the BS transmitting, to a UE, an indication of a repetition counting technique. At block 1004, the BS may determine a configuration of a number of repetitions of a channel to be received using a RACH message, each of the repetitions of the channel being during a slot available for UL. At block 1006, the BS may select the available slots to be used for the repetitions based on the repetition counting technique and the configuration of the number of repetitions. At block 1008, the BS may receive, from the UE, the RACH message in accordance with the selection of the available slots.

Figure 11:
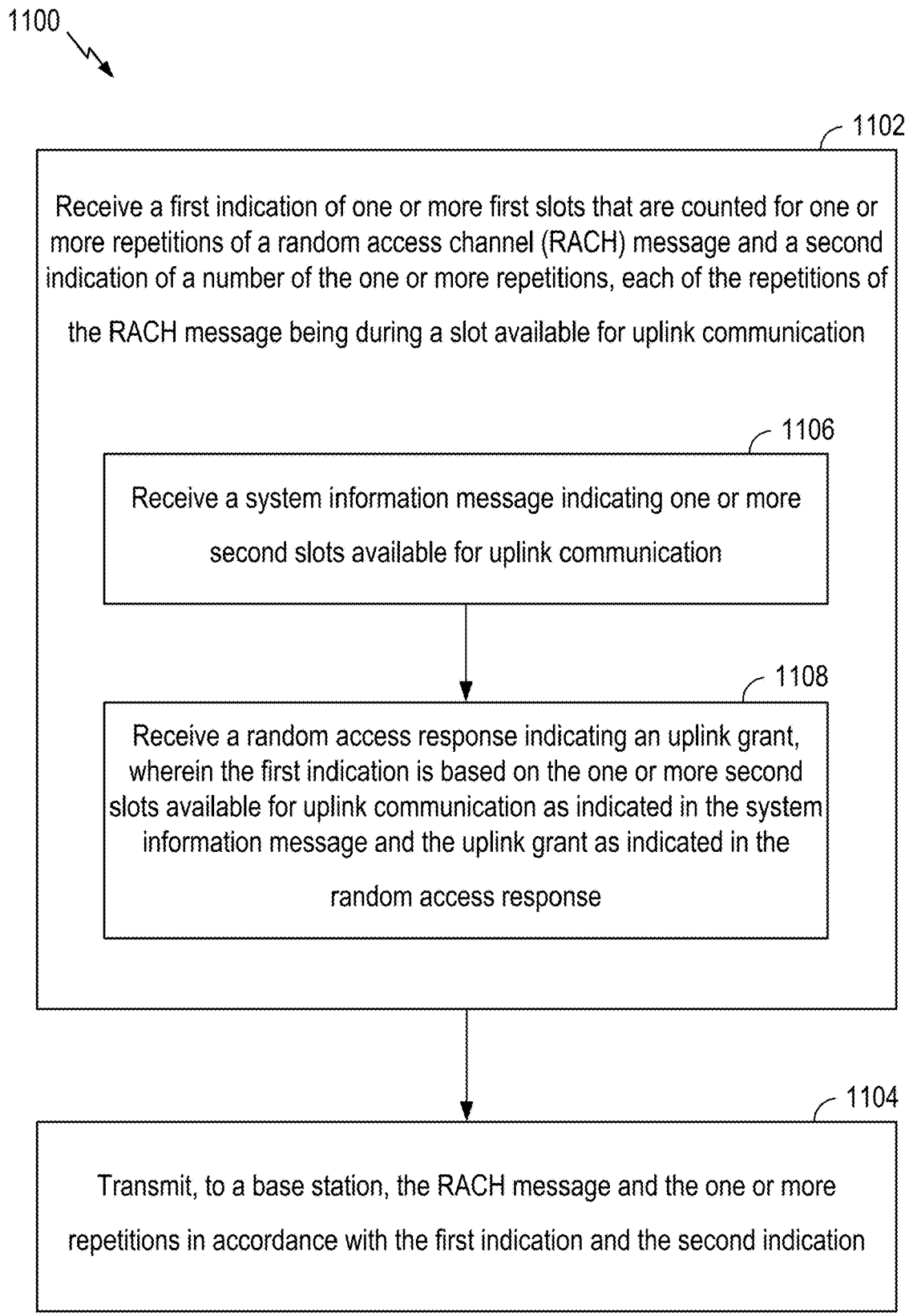
FIG. 11 is a flow diagram illustrating example operations for wireless communication, in accordance with certain aspects of the present disclosure.

FIG. 11 is a flow diagram illustrating example operations 1100 for wireless communication, in accordance with certain aspects of the present disclosure. The operations 1100 may be performed, for example, by a UE (e.g., such as the UE 104 in the wireless communication system 100). The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may optionally begin, at block 1102, where the UE may receive a first indication of one or more first slots (e.g., slots 502, 504, 514) that are counted for one or more repetitions (e.g., the PUSCH repetitions depicted in FIG. 8) of a RACH message (e.g., MSG3) and a second indication of a number of the one or more repetitions. Each of the repetitions of the RACH message may be during a slot available for uplink communication, for example, as depicted in FIG. 5B.

At block 1104, the UE may transmit, to a base station (e.g., the BS 102), the RACH message and the repetitions in accordance with the first indication and the second indication. The UE may transmit the RACH message and the repetitions via a PUSCH.

In certain aspects, the first indication and/or second indication may be received via multiple messages. For example, at block 1106, the UE may receive a system information message (e.g., the system information 402) indicating one or more second slots available for uplink communication. The system information message may include a RMSI, which may provide at least a TDD UL/DL frame slot pattern as illustrated in FIGS. 5A and 5B. At block 1108, the UE may receive a random access response (e.g., MSG2) indicating an uplink grant, which may provide the time domain resource allocation for the slots used for the repetitions. The first indication may be based on the second slots available for uplink communication as indicated in the system information message and the uplink grant as indicated in the random access response.

For certain aspects, the UE may receive the second indication via the random access response (e.g., MSG2), for example, as described herein with respect to FIG. 8.

In certain aspects, the RACH message may be MSG3 in a four-step RACH procedure, for example, as described herein with respect to FIGS. 4 and 8. For example, the UE may transmit a random access preamble (e.g., the RACH preamble 404). The UE may receive the random access response (e.g., MSG2) in response to the random access preamble, and the UE may transmit the RACH message (e.g., MSG3) and the repetitions in response to the random access response.

For certain aspects, the UE may select one or more third slots to be used for the one or more repetitions based on the first indication and the second indication. For example, the UE may select the third slots among the second slots available for uplink communication and the slots allocated in the uplink grant for the repetitions based on the number of repetitions. The slots allocated in the uplink grant may be a portion of the second slots available for uplink communication, and the number of repetitions may provide the number of slots to use from the portion of the second slots available for uplink communication. The UE may transmit the repetitions in the third slots.

In certain aspects, the first indication may include an indication to count only the second slots available for uplink communication, such as the counting technique described herein with respect to FIG. 5B. In certain cases, the first indication may include an indication to count both the second slots available for uplink communication and one or more other slots that are unavailable for uplink communication, such as the counting technique described herein with respect to FIG. 5A.

For certain aspects, the UE may determine the first slots that are counted for the repetitions based at least in part on various criteria. In certain cases, the UE may determine the first slots that are counted for the repetitions based at least in part on an uplink-downlink duplexing procedure (e.g., TDD), frequency range, or subcarrier spacing associated with communication with the base station.

Figure 12:
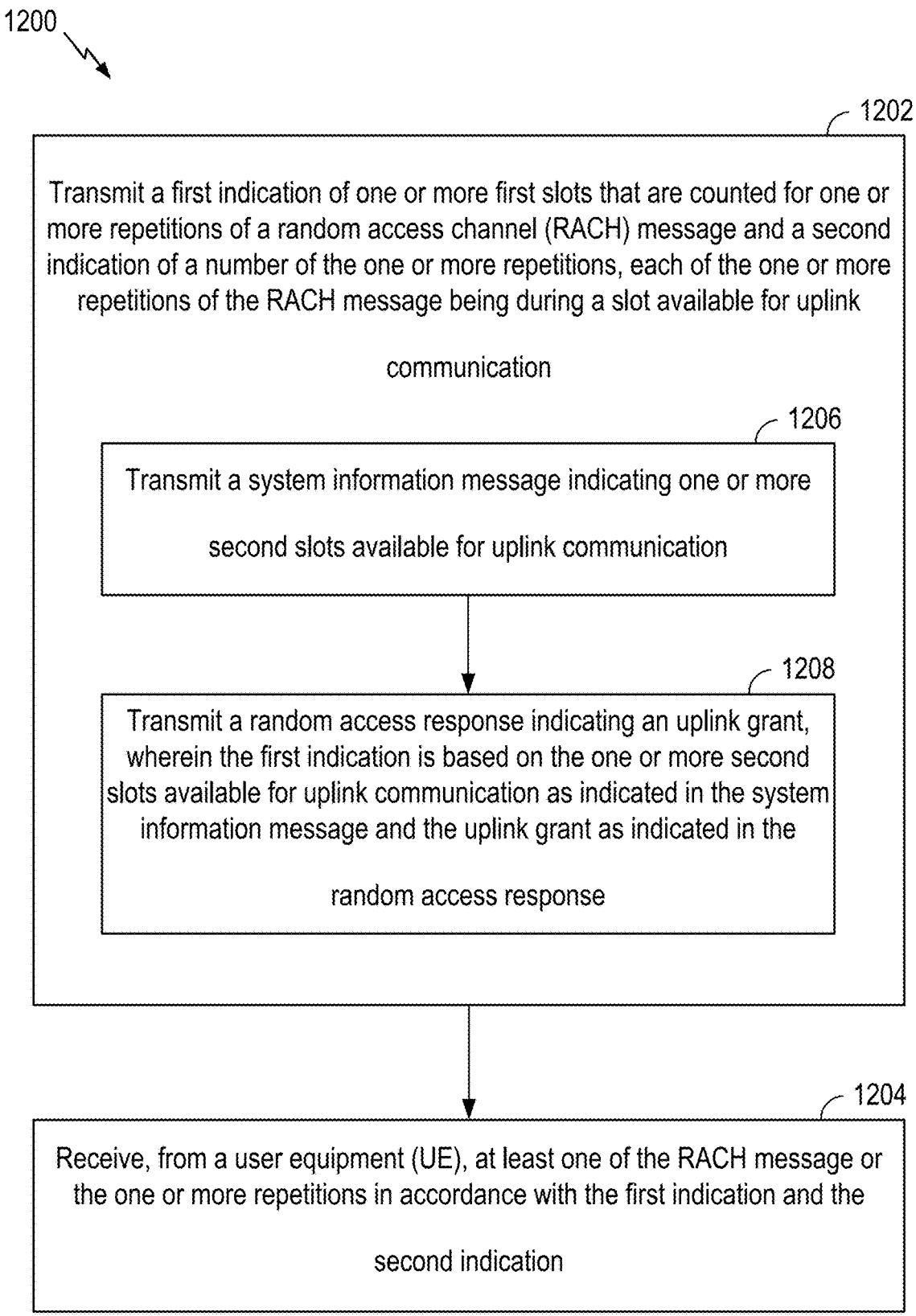
FIG. 12 is a flow diagram illustrating example operations for wireless communication, in accordance with certain aspects of the present disclosure.

FIG. 12 is a flow diagram illustrating example operations 1200 for wireless communication, in accordance with certain aspects of the present disclosure. The operations 1200 may be performed, for example, by a BS (e.g., such as the BS 102 in the wireless communications system 100). The operations 1200 may be complementary to the operations 1100 performed by the UE. The operations 1200 may be implemented as software components that are executed and run on one or more processors (e.g., controller/processor 240 of FIG. 2). Further, the transmission and reception of signals by the BS in operations 1200 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1200 may optionally begin, at block 1202, where the BS may transmit, to a UE (e.g., the UE 104), a first indication of one or more first slots that are counted for one or more repetitions of a random access channel (RACH) message and a second indication of a number of the one or more repetitions, each of the one or more repetitions of the RACH message being during a slot available for uplink communication.

At block 1204, the BS may receive, from the UE, at least one of the RACH message or the repetitions in accordance with the first indication and the second indication. The BS may receive at least one of the RACH message or the repetitions via a PUSCH.

In certain aspects, the first indication and/or second indication may be transmitted via multiple messages. At block 1206, the BS may transmit a system information message (e.g., the system information 402) indicating one or more second slots available for uplink communication, and at block 1208, the BS may transmit a random access response (e.g., MSG2) indicating an uplink grant. The system information message may include RMSI. The first indication may be based on the second slots available for uplink communication as indicated in the system information message and the uplink grant as indicated in the random access response. The BS may also transmit the second indication via the random access response.

In certain aspects, the RACH message may be MSG3 in a four-step RACH procedure, for example, as described herein with respect to FIGS. 4 and 8. For example, the BS may receive a random access preamble (e.g., the RACH preamble 404). The BS may transmit the random access response (e.g., MSG2) in response to the random access preamble, and the BS may receive the RACH message (e.g., MSG3) and/or the repetitions in response to the random access response.

For certain aspects, the BS may select one or more third slots to be used for the one or more repetitions based on the first indication and the second indication, for example, as described herein with respect to the operations 1100. The BS may monitor for and/or receive the repetitions in the one or more third slots.

In certain aspects, the first indication may include an indication to count only the second slots available for uplink communication, such as the counting technique described herein with respect to FIG. 5B. In certain cases, the first indication may include an indication to count both the second slots available for uplink communication and one or more other slots that are unavailable for uplink communication, such as the counting technique described herein with respect to FIG. 5A.

For certain aspects, the BS may determine the first slots that are counted for the repetitions based at least in part on an uplink-downlink duplexing procedure (e.g., TDD), frequency range, or subcarrier spacing associated with communication with the UE.

Example Wireless Communication Devices

Figure 13:
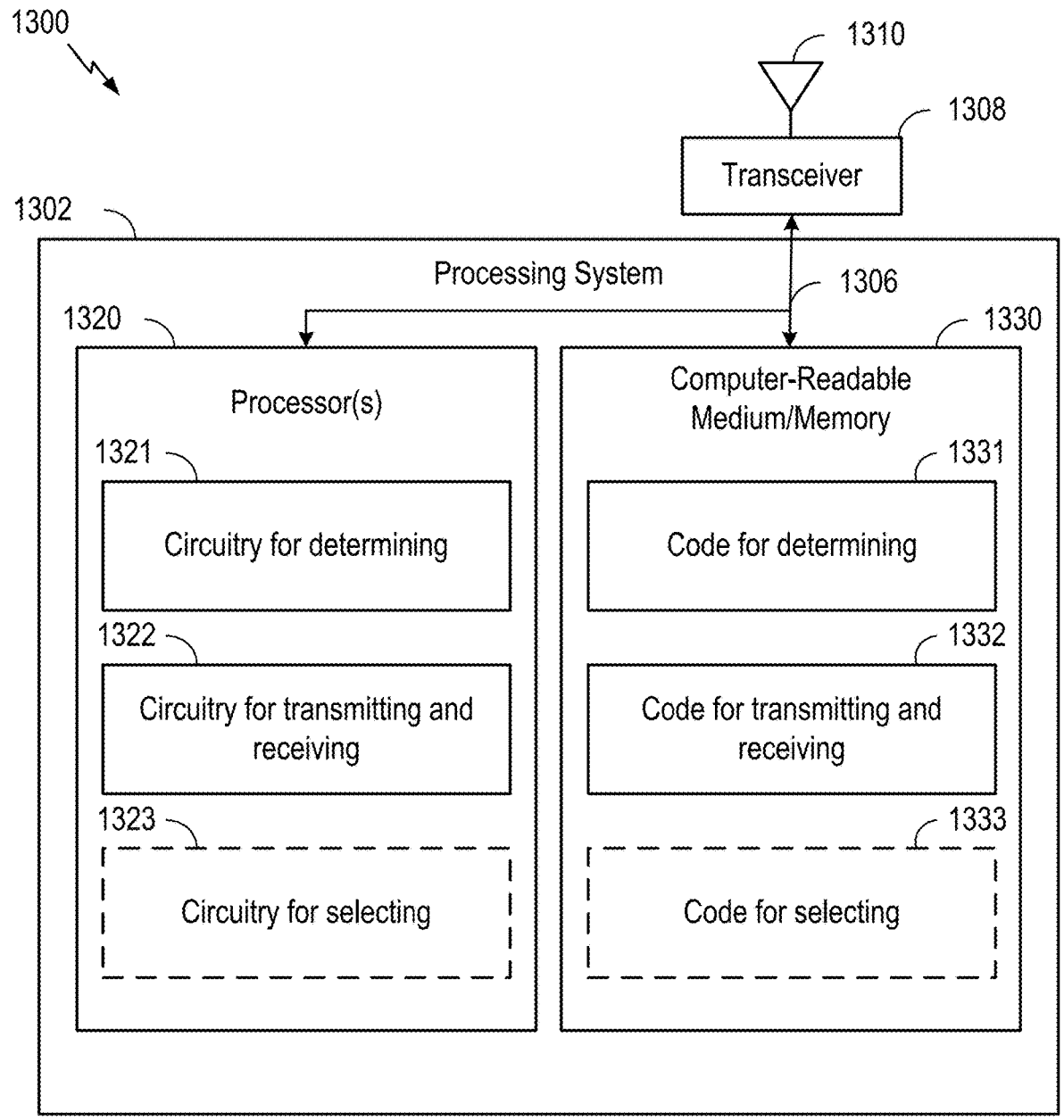
FIGS. 13 and 14 depict example communications devices that include various components operable, configured, or adapted to perform operations for the techniques disclosed herein.

FIG. 13 depicts an example communications device 1300 that includes various components operable, configured, or adapted to perform operations for the techniques disclosed herein, such as the operations depicted and described with respect to FIGS. 7, 10, and 12. In some examples, communication device 1300 may be a base station 102 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIGS. 7, 10, and 12, or other operations for performing the various techniques discussed herein for channel repetition.

In the depicted example, computer-readable medium/memory 1330 stores code 1331 for determining, code 1332 for transmitting and receiving. Computer-readable medium/memory 1330 may optionally also include code 1333 for selecting.

In the depicted example, the one or more processors 1320 include circuitry configured to implement the code stored in the computer-readable medium/memory 1330, including circuitry 1321 for determining, circuitry 1322 for transmitting and receiving. The one or more processors 1320 may optionally also include circuitry 1323 for selecting.

Various components of communications device 1300 may provide means for performing the methods described herein, including with respect to FIGS. 7, 10, and 12.

In some examples, means for transmitting or sending (or means for outputting for transmission) may include the transceivers 232 and/or antenna(s) 234 of the base station 102 illustrated in FIG. 2 and/or transceiver 1308 and antenna 1310 of the communication device 1300 in FIG. 13.

In some examples, means for receiving (or means for obtaining) may include the transceivers 232 and/or antenna(s) 234 of the base station illustrated in FIG. 2 and/or transceiver 1308 and antenna 1310 of the communication device 1300 in FIG. 13.

In some examples, means for transmitting, means for receiving, means for determining, and means for selecting may include various processing system components, such as: the one or more processors 1320 in FIG. 13, or aspects of the base station 102 depicted in FIG. 2, including receive processor 238, transmit processor 220, TX MIMO processor 230, and/or controller/processor 240 (including repetition manager 241).

Notably, FIG. 13 is an example, and many other examples and configurations of communication device 1300 are possible.

Figure 14:
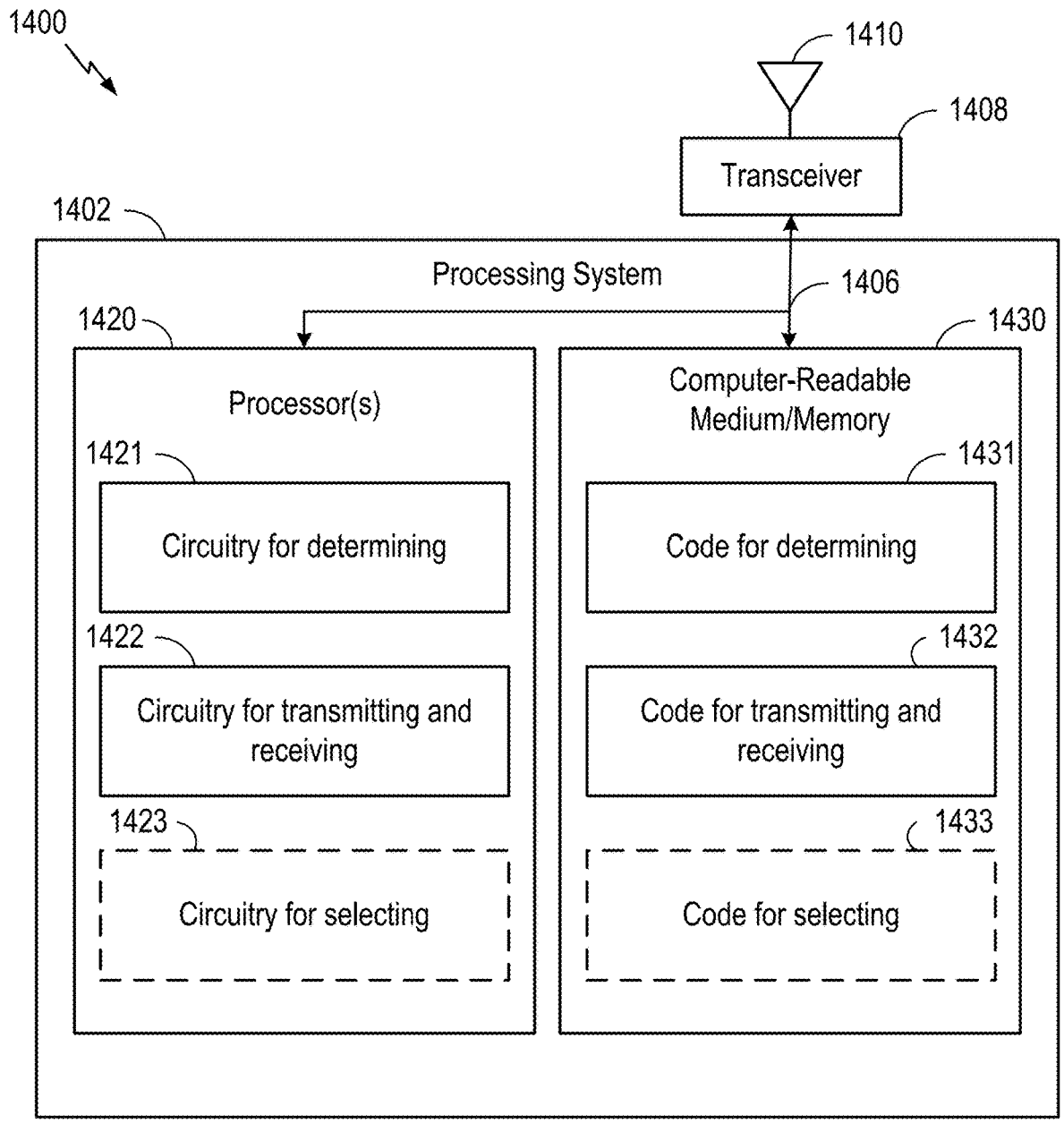

FIG. 14 depicts an example communications device 1400 that includes various components operable, configured, or adapted to perform operations for the techniques disclosed herein, such as the operations depicted and described with respect to FIGS. 6, 9, and 11. In some examples, communication device 1400 may be a user equipment 104 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIGS. 6, 9, and 11, or other operations for performing the various techniques discussed herein for channel repetition.

In the depicted example, computer-readable medium/memory 1430 stores code 1431 for determining, code 1432 for transmitting and receiving. Computer-readable medium/memory 1430 may optionally also include code 1433 for selecting.

In the depicted example, the one or more processors 1420 include circuitry configured to implement the code stored in the computer-readable medium/memory 1430, including circuitry 1421 for determining, circuitry 1422 for transmitting and receiving. The one or more processors 1420 may optionally also include circuitry 1423 for selecting.

Various components of communications device 1400 may provide means for performing the methods described herein, including with respect to FIGS. 6, 9, and 11.

In some examples, means for transmitting or sending (or means for outputting for transmission) may include the transceivers 254 and/or antenna(s) 252 of the user equipment 104 illustrated in FIG. 2 and/or transceiver 1408 and antenna 1410 of the communication device 1400 in FIG. 14.

In some examples, means for receiving (or means for obtaining) may include the transceivers 254 and/or antenna(s) 252 of the user equipment 104 illustrated in FIG. 2 and/or transceiver 1408 and antenna 1410 of the communication device 1400 in FIG. 14.

In some examples, means for transmitting, means for receiving, means for determining, and means for selecting may include various processing system components, such as: the one or more processors 1420 in FIG. 14, or aspects of the user equipment 104 depicted in FIG. 2, including receive processor 258, transmit processor 264, TX MIMO processor 266, and/or controller/processor 280 (including repetition manager 281).

Notably, FIG. 14 is an example, and many other examples and configurations of communication device 1400 are possible.

EXAMPLE CLAUSES

Implementation examples are described in the following numbered clauses:

Aspect 1: A method for wireless communication by a user-equipment (UE), comprising: determining a configuration of a number of repetitions of a channel to be transmitted using a random access channel (RACH) message, each of the repetitions of the channel being during a slot available for uplink (UL), wherein the number of repetitions corresponds to a number of the available slots to be used for the repetitions; and transmitting, to a base station, the RACH message in accordance with the configuration of the number of repetitions.

Aspect 2: The method of aspect 1, further comprising receiving, from the base station, the configuration of the number of repetitions.

Aspect 3: The method of any of aspects 1-2, wherein the channel comprises a physical uplink shared channel (PUSCH).

Aspect 4: The method of any of aspects 1-3, further comprising: transmitting a random access preamble; and receiving a random access response to the random access preamble, wherein the RACH message is transmitted in response to receiving the random access response.

Aspect 5: The method of any of aspects 1-4, further comprising: receiving an indication of a repetition counting technique; and selecting the available slots to be used for the repetitions based on the repetition counting technique and the configuration of the number of repetitions.

Aspect 6: The method of aspect 5, wherein the indication of the repetition counting technique comprises: an indication to count only the available slots for the selecting of the available slots to be used for the repetitions; or an indication to count both the available slots and one or more other slots that are unavailable for UL for the selecting of the available slots to be used for the repetitions.

Aspect 7: The method of any of aspects 5-6, wherein the indication of the repetition counting technique is received via a system information message.

Aspect 8: The method of any of aspects 5-7, further comprising: transmitting a random access preamble; and receiving a random access response to the random access preamble, wherein the indication of the repetition counting technique is received via the random access response.

Aspect 9: The method of any of aspects 5-8, further comprising: transmitting a random access preamble; and receiving a control channel scheduling reception of a random access response to the random access preamble, wherein the indication of the repetition counting technique is received via the control channel.

Aspect 10: The method of any of aspects 5-9, wherein the indication of the repetition counting technique comprises an indication of one of candidate repetition counting techniques.

Aspect 11: The method of aspect 10, further comprising determining the candidate repetition counting techniques based on an UL or downlink (DL) duplexing method, frequency range, or subcarrier spacing associated with communication with the base station.

Aspect 12: A method for wireless communication by a user-equipment (UE), comprising: receiving, from a base station, an indication of a repetition counting technique; determining a configuration of a number of repetitions of a channel to be transmitted using a random access channel (RACH) message, each of the repetitions of the channel being during a slot available for uplink (UL); selecting the available slots to be used for the repetitions based on the repetition counting technique and the configuration of the number of repetitions; and transmitting, to the base station, the RACH message in accordance with the selection of the available slots.

Aspect 13: The method of aspect 12, further comprising receiving, from the base station, the configuration of the number of repetitions.

Aspect 14: The method of any of aspects 12-13, wherein the channel comprises a schedule physical uplink shared channel (PUSCH).

Aspect 15: The method of any of aspects 12-14, further comprising: transmitting a random access preamble; and receiving a random access response to the random access preamble, wherein the RACH message is transmitted in response to receiving the random access response.

Aspect 16: The method of any of aspects 12-15, wherein the indication of the repetition counting technique comprises: an indication to count only the available slots for the selecting of the available slots to be used for the repetitions; or an indication to count both the available slots and one or more other slots that are unavailable for UL for the selecting of the available slots to be used for the repetitions.

Aspect 17: The method of any of aspects 12-16, wherein the indication of the repetition counting technique is received via a system information message.

Aspect 18: The method of any of aspects 12-17, further comprising: transmitting a random access preamble; and receiving a random access response to the random access preamble, wherein the indication of the repetition counting technique is received via the random access response.

Aspect 19: The method of any of aspects 12-18, further comprising: transmitting a random access preamble; and receiving a control channel scheduling reception of a random access response to the random access preamble, wherein the indication of the repetition counting technique is received via the control channel.

Aspect 20: The method of any of aspects 12-19, wherein the indication of the repetition counting technique comprises an indication of one of candidate repetition counting techniques.

Aspect 21: The method of aspect 20, further comprising determining the candidate repetition counting techniques based on an UL or downlink (DL) duplexing method, frequency range, or subcarrier spacing associated with communication with the base station.

Aspect 22: A method for wireless communication by a base station, comprising: determining a configuration of a number of repetitions of a channel to be received using a random access channel (RACH) message, each of the repetitions of the channel being during a slot available for uplink (UL), wherein the number of repetitions corresponds to a number of the available slots to be used for the repetitions; and receiving, from a user-equipment (UE), the RACH message in accordance with the configuration of the number of repetitions.

Aspect 23: The method of aspect 22, further comprising transmitting, to the UE, the configuration of the number of repetitions.

Aspect 24: The method of any of aspects 22-23, wherein the channel comprises a physical uplink shared channel (PUSCH).

Aspect 25: The method of any of aspects 22-24, further comprising: receiving a random access preamble; and transmitting a random access response to the random access preamble, wherein the RACH message is transmitted in response to receiving the random access response.

Aspect 26: The method of any of aspects 22-25, further comprising: transmitting an indication of a repetition counting technique; and selecting the available slots to be used for the repetitions based on the repetition counting technique and the configuration of the number of repetitions.

Aspect 27: The method of aspect 26, wherein the indication of the repetition counting technique comprises: an indication to count only the available slots for the selecting of the available slots to be used for the repetitions; or an indication to count both the available slots and one or more other slots that are unavailable for UL for the selecting of the available slots to be used for the repetitions.

Aspect 28: The method of any of aspects 26-27, wherein the indication of the repetition counting technique is transmitted via a system information message.

Aspect 29: The method of any of aspects 26-28, further comprising: receiving a random access preamble; and transmitting a random access response to the random access preamble, wherein the indication of the repetition counting technique is transmitted via the random access response.

Aspect 30: The method of any of aspects 26-29, further comprising: receiving a random access preamble; and transmitting a control channel scheduling reception of a random access response to the random access preamble, wherein the indication of the repetition counting technique is transmitted via the control channel.

Aspect 31: The method of any one of aspects 26-30, wherein the indication of the repetition counting technique comprises an indication of one of candidate repetition counting techniques.

Aspect 32: The method of aspect 31, further comprising determining the candidate repetition counting techniques based on an UL or downlink (DL) duplexing method, frequency range, or subcarrier spacing associated with communication with the base station.

Aspect 33: A method for wireless communication by a base station, comprising: transmitting, to a user-equipment (UE), an indication of a repetition counting technique; determining a configuration of a number of repetitions of a channel to be received using a random access channel (RACH) message, each of the repetitions of the channel being during a slot available for uplink (UL); selecting the available slots to be used for the repetitions based on the repetition counting technique and the configuration of the number of repetitions; and receiving, from the UE, the RACH message in accordance with the selection of the available slots.

Aspect 34: The method of aspect 33, further comprising transmitting, to the UE, the configuration of the number of repetitions.

Aspect 35: The method of any of aspects 33-34, wherein the channel comprises a schedule physical uplink shared channel (PUSCH).

Aspect 36: The method of any of aspects 33-45, further comprising: receiving a random access preamble; and transmitting a random access response to the random access preamble, wherein the RACH message is transmitted in response to transmitted the random access response.

Aspect 37: The method of any of aspects 33-36, wherein the indication of the repetition counting technique comprises: an indication to count only the available slots for the selecting of the available slots to be used for the repetitions; or an indication to count both the available slots and one or more other slots that are unavailable for UL for the selecting of the available slots to be used for the repetitions.

Aspect 38: The method of any of aspects 33-37, wherein the indication of the repetition counting technique is transmitted via a system information message.

Aspect 39: The method of any of aspects 33-38, further comprising: receiving a random access preamble; and transmitting a random access response to the random access preamble, wherein the indication of the repetition counting technique is transmitted via the random access response.

Aspect 40: The method of any of aspects 33-39, further comprising: receiving a random access preamble; and transmitting a control channel scheduling reception of a random access response to the random access preamble, wherein the indication of the repetition counting technique is transmitted via the control channel.

Aspect 41: The method of any of aspects 33-40, wherein the indication of the repetition counting technique comprises an indication of one of candidate repetition counting techniques.

Aspect 42: The method of aspect 41, further comprising determining the candidate repetition counting techniques based on an UL or downlink (DL) duplexing method, frequency range, or subcarrier spacing associated with communication with the base station.

Aspect 43: An apparatus for wireless communication, comprising: a memory; and a processor coupled to the memory, the processor being configured to: receive a first indication of one or more first slots that are counted for one or more repetitions of a random access channel (RACH) message and a second indication of a number of the one or more repetitions, each of the one or more repetitions of the RACH message being during a slot available for uplink communication, and transmit, to a base station, the RACH message and the one or more repetitions in accordance with the first indication and the second indication.

Aspect 44: The apparatus of Aspect 43, wherein the processor is further configured to: receive a system information message indicating one or more second slots available for uplink communication; and receive a random access response indicating an uplink grant, wherein the first indication is based on the one or more second slots available for uplink communication as indicated in the system information message and the uplink grant as indicated in the random access response.

Aspect 45: The apparatus of Aspect 44, wherein the processor is further configured to receive the second indication via the random access response.

Aspect 46: The apparatus of Aspect 44 or 45, wherein the processor is further configured to: transmit a random access preamble; and receive the random access response in response to the random access preamble.

Aspect 47: The apparatus according to any of Aspects 44-46, wherein the system information message includes remaining minimum system information (RMSI).

Aspect 48: The apparatus according to any of Aspects 43-47, wherein the processor is further configured to: select one or more third slots to be used for the one or more repetitions based on the first indication and the second indication; and transmit the one or more repetitions in the one or more third slots.

Aspect 49: The apparatus of Aspect 43 or 48, wherein the processor is further configured to: transmit a random access preamble; receive a random access response in response to the random access preamble; and transmit the RACH message and the one or more repetitions in response to the random access response.

Aspect 50: The apparatus according to any of Aspects 43-49, wherein the processor is further configured to transmit the RACH message and the one or more repetitions via a physical uplink shared channel (PUSCH).

Aspect 51: The apparatus according to any of Aspects 44-50, wherein the first indication comprises: an indication to count only the one or more second slots available for uplink communication; or an indication to count both the one or more second slots available for uplink communication and one or more other slots that are unavailable for uplink communication.

Aspect 52: The apparatus according to any of Aspects 43-51, wherein the processor is further configured to determine the one or more first slots that are counted for the one or more repetitions based at least in part on an uplink-downlink duplexing procedure, frequency range, or subcarrier spacing associated with communication with the base station.

Aspect 53: An apparatus for wireless communication, comprising: a memory; and a processor coupled to the memory, the processor being configured to: transmit a first indication of one or more first slots that are counted for one or more repetitions of a random access channel (RACH) message and a second indication of a number of the one or more repetitions, each of the one or more repetitions of the RACH message being during a slot available for uplink communication, and receive, from a user equipment (UE), at least one of the RACH message or the one or more repetitions in accordance with the first indication and the second indication.

Aspect 54: The apparatus of Aspect 53, wherein the processor is further configured to: transmit a system information message indicating one or more second slots available for uplink communication; and transmit a random access response indicating an uplink grant, wherein the first indication is based on the one or more second slots available for uplink communication as indicated in the system information message and the uplink grant as indicated in the random access response.

Aspect 55: The apparatus of Aspect 54, wherein the processor is further configured to transmit the second indication via the random access response.

Aspect 56: The apparatus of Aspect 54 or 55, wherein the processor is further configured to: receive a random access preamble; and transmit the random access response in response to the random access preamble.

Aspect 57: The apparatus according to any of Aspects 54-56, wherein the system information message includes remaining minimum system information (RMSI).

Aspect 58: The apparatus according to any of Aspect 53-57, wherein the processor is further configured to: select one or more third slots to be used for the one or more repetitions based on the first indication and the second indication; and receive the one or more repetitions in the one or more third slots.

Aspect 59: The apparatus of Aspect 53 or 58, wherein the processor is further configured to: receive a random access preamble; transmit a random access response in response to the random access preamble; and receive at least one of the RACH message or the one or more repetitions in response to the random access response.

Aspect 60: The apparatus according to any of Aspects 53-59, wherein the processor is further configured to receive at least one of the RACH message or the one or more repetitions via a physical uplink shared channel (PUSCH).

Aspect 61: The apparatus according to any of Aspect 54-60, wherein the first indication comprises: an indication to count only the one or more second slots available for uplink communication; or an indication to count both the one or more second slots available for uplink communication and one or more other slots that are unavailable for uplink communication.

Aspect 62: The apparatus according to any of Aspects 53-61, wherein the processor is further configured to determine the one or more first slots that are counted for the one or more repetitions based at least in part on an uplink-downlink duplexing procedure, frequency range, or subcarrier spacing associated with communication with the UE.

Aspect 63: A method for wireless communication by a user equipment (UE), comprising: receiving a first indication of one or more first slots that are counted for one or more repetitions of a random access channel (RACH) message and a second indication of a number of the one or more repetitions, each of the repetitions of the RACH message being during a slot available for uplink communication; and transmitting, to a base station, the RACH message and the one or more repetitions in accordance with the first indication and the second indication.

Aspect 64: The method of Aspect 63, wherein receiving the first indication and the second indication comprises: receiving a system information message indicating one or more second slots available for uplink communication; and receiving a random access response indicating an uplink grant, wherein the first indication is based on the one or more second slots available for uplink communication as indicated in the system information message and the uplink grant as indicated in the random access response.

Aspect 65: The method of Aspect 64, wherein receiving the first indication and the second indication further comprises receiving the second indication via the random access response.

Aspect 66: The method of Aspect 64 or 65, further comprising: transmitting a random access preamble; selecting one or more third slots to be used for the one or more repetitions based on the first indication and the second indication; wherein receiving the random access response comprises receiving the random access response in response to the random access preamble; and wherein transmitting the one or more repetitions comprises transmitting the one or more repetitions in the one or more third slots.

Aspect 67: The method according to any of Aspects 64-66, wherein the system information message includes remaining minimum system information (RMSI).

Aspect 68: A method for wireless communication by a base station, comprising: transmitting a first indication of one or more first slots that are counted for one or more repetitions of a random access channel (RACH) message and a second indication of a number of the one or more repetitions, each of the one or more repetitions of the RACH message being during a slot available for uplink communication; and receiving, from a user equipment (UE), at least one of the RACH message or the one or more repetitions in accordance with the first indication and the second indication.

Aspect 69: The method of Aspect 68, wherein transmitting the first indication and the second indication comprises: transmitting a system information message indicating one or more second slots available for uplink communication; and transmitting a random access response indicating an uplink grant, wherein the first indication is based on the one or more second slots available for uplink communication as indicated in the system information message and the uplink grant as indicated in the random access response.

Aspect 70: The method of Aspect 69, wherein transmitting the first indication and the second indication further comprises transmitting the second indication via the random access response.

Aspect 71: The method of Aspect 69 or 70, further comprising: receiving a random access preamble; selecting one or more third slots to be used for the one or more repetitions based on the first indication and the second indication; wherein transmitting the random access response comprises transmitting the random access response in response to the random access preamble; and wherein receiving the one or more repetitions comprises receiving the one or more repetitions in the one or more third slots.

Aspect 72: The method according to any of Aspects 69-71, wherein the system information message includes remaining minimum system information (RMSI).

Aspect 73: An apparatus, comprising: a memory and one or more processors coupled to the memory, the one or more processors being configured to perform a method in accordance with any of aspects 1-42 or 63-72.

Aspect 74: An apparatus, comprising means for performing a method in accordance with any of aspects 1-42 or 63-72.

Aspect 75: A non-transitory computer-readable medium comprising executable instructions that, when executed by one or more processors of an apparatus, cause the apparatus to perform a method in accordance with any of aspects 1-42 or 63-72.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communications system 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). ABS for a macro cell may be referred to as a macro BS. ABS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as base station 180, may operate in a traditional sub-6 GHz spectrum, in millimeter wave (mmWave) frequencies, and/or near mmWave frequencies in communication with the UE 104. When the base station 180 operates in mmWave or near mmWave frequencies, the base station 180 may be referred to as an mmWave base station or mmWave gNB.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communications system 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communications system 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of channel repetition in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
a memory; and
a processor coupled to the memory, the processor being configured to:
  receive a first indication of one or more first slots that are counted for one or more repetitions of a random access channel (RACH) message and a second indication of a number of the one or more repetitions, each of the one or more repetitions of the RACH message being during a slot available for uplink communication,
  receive a system information message indicating one or more second slots available for uplink communication;
  receive a random access response indicating an uplink grant, wherein the first indication is based on the one or more second slots available for uplink communication as indicated in the system information message and the uplink grant as indicated in the random access response, and
  transmit, to a base station, the RACH message and the one or more repetitions in accordance with the first indication and the second indication.

2. The apparatus of claim 1, wherein the processor is further configured to receive the second indication via the random access response.

3. The apparatus of claim 1, wherein the processor is further configured to:
  transmit a random access preamble; and
  receive the random access response in response to the random access preamble.

4. The apparatus of claim 1, wherein the system information message includes remaining minimum system information (RMSI).

5. The apparatus of claim 1, wherein the processor is further configured to:
  select one or more third slots to be used for the one or more repetitions based on the first indication and the second indication; and
  transmit the one or more repetitions in the one or more third slots.

6. The apparatus of claim 1, wherein the processor is further configured to:
  transmit a random access preamble;
  receive the random access response in response to the random access preamble; and
  transmit the RACH message and the one or more repetitions in response to the random access response.

7. The apparatus of claim 1, wherein the processor is further configured to transmit the RACH message and the one or more repetitions via a physical uplink shared channel (PUSCH).

8. The apparatus of claim 1, wherein the first indication comprises:
  an indication to count only the one or more second slots available for uplink communication; or
  an indication to count both the one or more second slots available for uplink communication and one or more other slots that are unavailable for uplink communication.

9. The apparatus of claim 1, wherein the processor is further configured to determine the one or more first slots that are counted for the one or more repetitions based at least in part on an uplink-downlink duplexing procedure, frequency range, or subcarrier spacing associated with communication with the base station.

10. An apparatus for wireless communication, comprising:
a memory; and
a processor coupled to the memory, the processor being configured to:
  transmit a first indication of one or more first slots that are counted for one or more repetitions of a random access channel (RACH) message and a second indication of a number of the one or more repetitions, each of the one or more repetitions of the RACH message being during a slot available for uplink communication,
  transmit a system information message indicating one or more second slots available for uplink communication,
  transmit a random access response indicating an uplink grant, wherein the first indication is based on the one or more second slots available for uplink communication as indicated in the system information message and the uplink grant as indicated in the random access response, and
  receive, from a user equipment (UE), at least one of the RACH message or the one or more repetitions in accordance with the first indication and the second indication.

11. The apparatus of claim 10, wherein the processor is further configured to transmit the second indication via the random access response.

12. The apparatus of claim 10, wherein the processor is further configured to:
  receive a random access preamble; and
  transmit the random access response in response to the random access preamble.

13. The apparatus of claim 10, wherein the system information message includes remaining minimum system information (RMSI).

14. The apparatus of claim 10, wherein the processor is further configured to:
  select one or more third slots to be used for the one or more repetitions based on the first indication and the second indication; and
  receive the one or more repetitions in the one or more third slots.

15. The apparatus of claim 10, wherein the processor is further configured to:
  receive a random access preamble;

transmit the random access response in response to the random access preamble; and receive at least one of the RACH message or the one or more repetitions in response to the random access response.

16. The apparatus of claim 10, wherein the processor is further configured to receive at least one of the RACH message or the one or more repetitions via a physical uplink shared channel (PUSCH).

17. The apparatus of claim 11, wherein the first indication comprises:
an indication to count only the one or more second slots available for uplink communication; or
an indication to count both the one or more second slots available for uplink communication and one or more other slots that are unavailable for uplink communication.

18. The apparatus of claim 10, wherein the processor is further configured to determine the one or more first slots that are counted for the one or more repetitions based at least in part on an uplink-downlink duplexing procedure, frequency range, or subcarrier spacing associated with communication with the UE.

19. A method for wireless communication by a user equipment (UE), comprising:
receiving a first indication of one or more first slots that are counted for one or more repetitions of a random access channel (RACH) message and a second indication of a number of the one or more repetitions, each of the repetitions of the RACH message being during a slot available for uplink communication;
wherein receiving the first indication and the second indication comprises:
receiving a system information message indicating one or more second slots available for uplink communication; and
receiving a random access response indicating an uplink grant, wherein the first indication is based on the one or more second slots available for uplink communication as indicated in the system information message and the uplink grant as indicated in the random access response; and
transmitting, to a base station, the RACH message and the one or more repetitions in accordance with the first indication and the second indication.

20. The method of claim 19, wherein receiving the first indication and the second indication further comprises receiving the second indication via the random access response.

21. The method of claim 19, further comprising:
transmitting a random access preamble;
selecting one or more third slots to be used for the one or more repetitions based on the first indication and the second indication;

wherein receiving the random access response comprises receiving the random access response in response to the random access preamble; and
wherein transmitting the one or more repetitions comprises transmitting the one or more repetitions in the one or more third slots.

22. The method of claim 19, wherein the system information message includes remaining minimum system information (RMSI).

23. A method for wireless communication by a base station, comprising:
transmitting a first indication of one or more first slots that are counted for one or more repetitions of a random access channel (RACH) message and a second indication of a number of the one or more repetitions, each of the one or more repetitions of the RACH message being during a slot available for uplink communication;
wherein transmitting the first indication and the second indication comprises:
transmitting a system information message indicating one or more second slots available for uplink communication; and
transmitting a random access response indicating an uplink grant, wherein the first indication is based on the one or more second slots available for uplink communication as indicated in the system information message and the uplink grant as indicated in the random access response; and
receiving, from a user equipment (UE), at least one of the RACH message or the one or more repetitions in accordance with the first indication and the second indication.

24. The method of claim 23, wherein transmitting the first indication and the second indication further comprises transmitting the second indication via the random access response.

25. The method of claim 23, further comprising:
receiving a random access preamble;
selecting one or more third slots to be used for the one or more repetitions based on the first indication and the second indication;
wherein transmitting the random access response comprises transmitting the random access response in response to the random access preamble; and
wherein receiving the one or more repetitions comprises receiving the one or more repetitions in the one or more third slots.

26. The method of claim 23, wherein the system information message includes remaining minimum system information (RMSI).

* * * * *